March 8, 1960  D. HEYER  2,927,409
METHOD OF AND APPARATUS FOR FORMING SEALED PACKAGES
Filed Sept. 24, 1956  7 Sheets-Sheet 1

INVENTOR.
DON HEYER
BY
Paul A. Weilein
ATTORNEY.

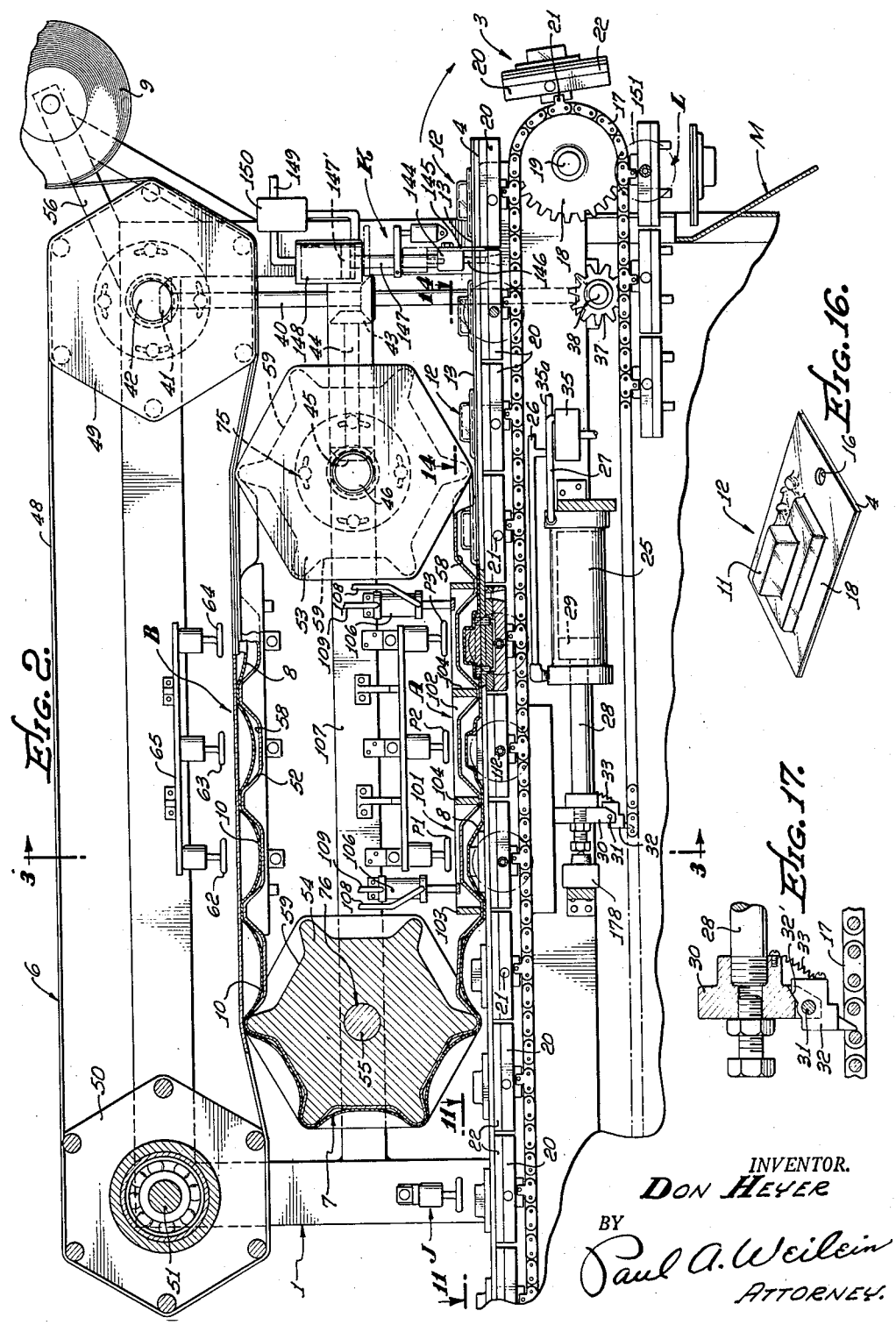

March 8, 1960 D. HEYER 2,927,409
METHOD OF AND APPARATUS FOR FORMING SEALED PACKAGES
Filed Sept. 24, 1956 7 Sheets-Sheet 3
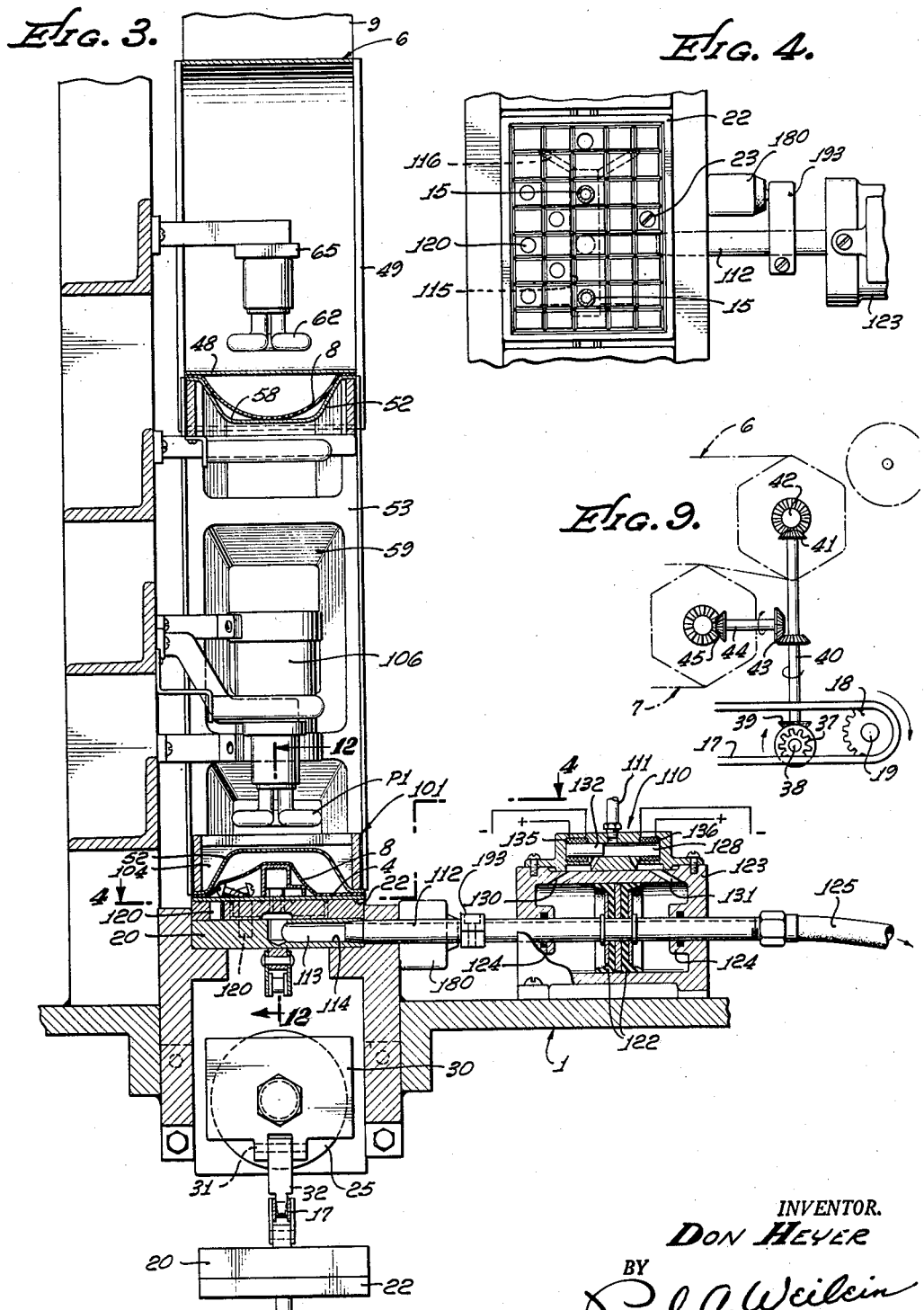
INVENTOR.
DON HEYER
BY
Paul A. Weilein
ATTORNEY.

March 8, 1960 D. HEYER 2,927,409
METHOD OF AND APPARATUS FOR FORMING SEALED PACKAGES
Filed Sept. 24, 1956 7 Sheets-Sheet 4
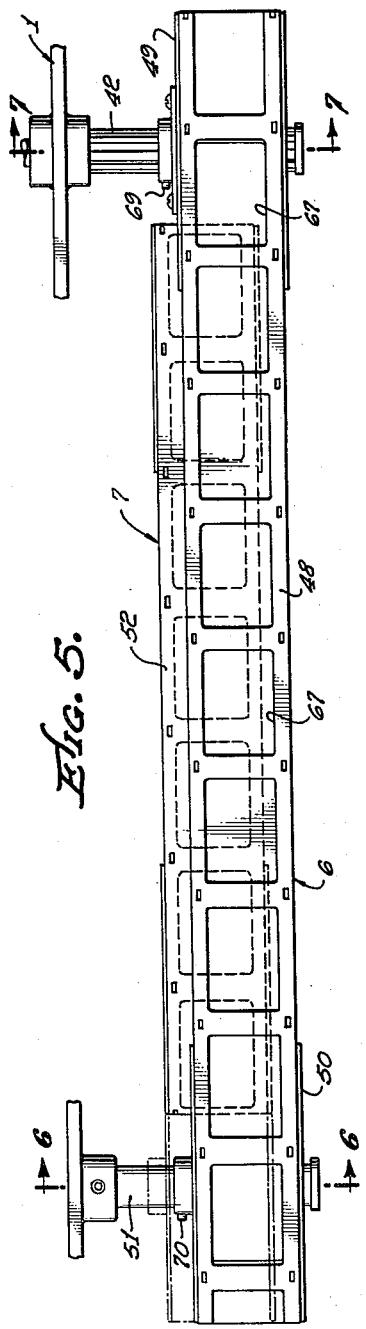
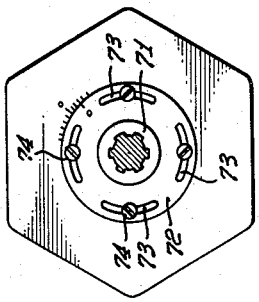
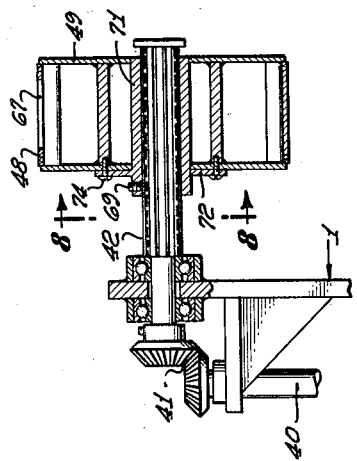
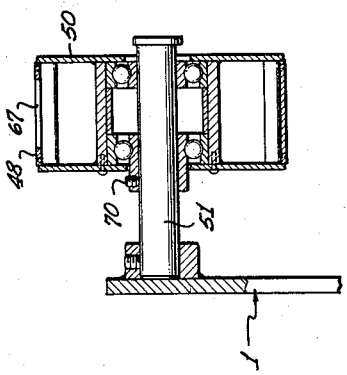
INVENTOR.
DON HEYER
BY
Paul A. Weilein
ATTORNEY.

March 8, 1960 D. HEYER 2,927,409
METHOD OF AND APPARATUS FOR FORMING SEALED PACKAGES
Filed Sept. 24, 1956 7 Sheets-Sheet 5
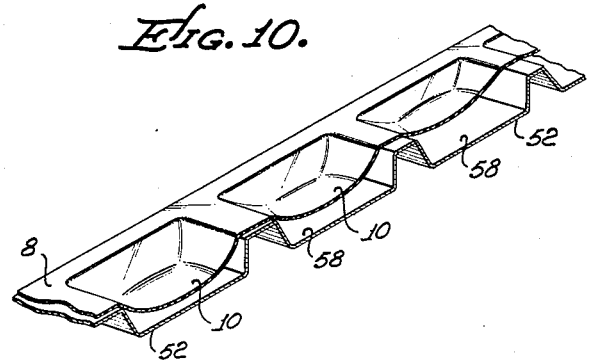
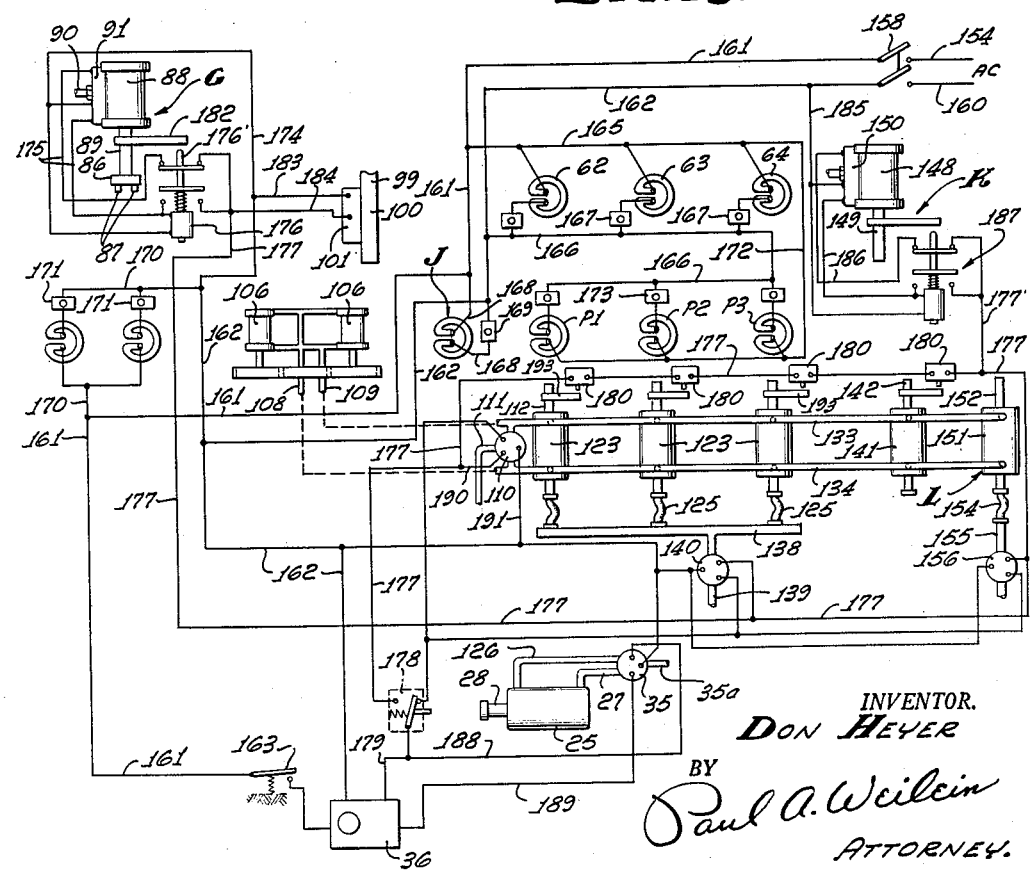
INVENTOR.
DON HEYER
BY
Paul A. Weilein
ATTORNEY.

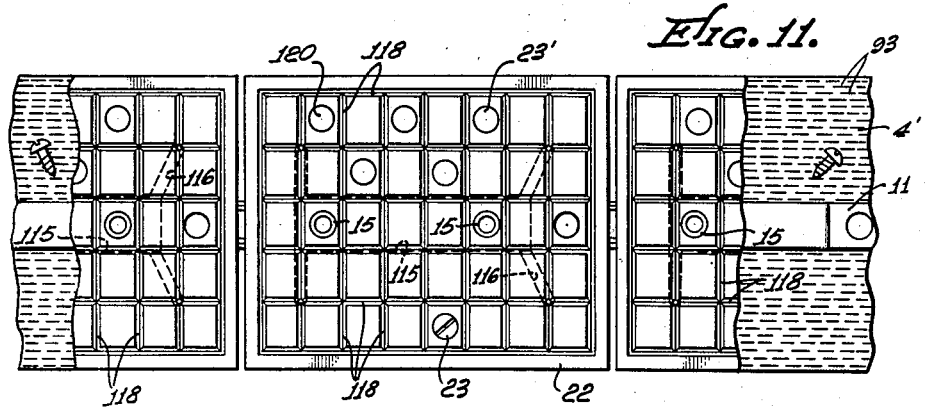
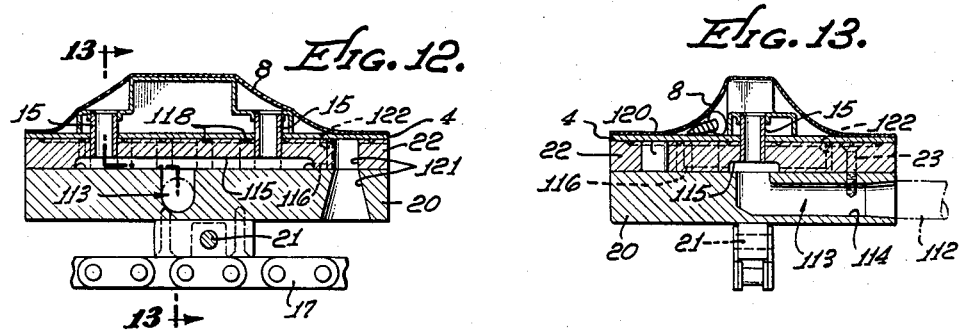
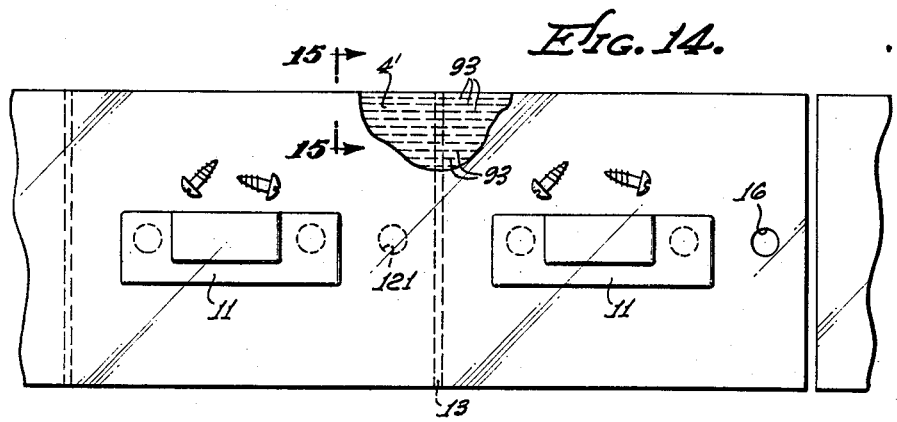
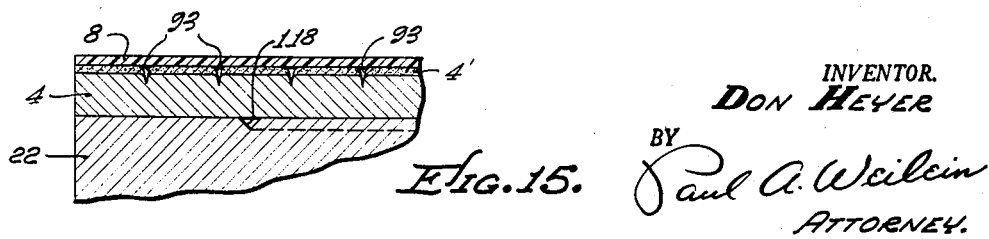

March 8, 1960 D. HEYER 2,927,409
METHOD OF AND APPARATUS FOR FORMING SEALED PACKAGES
Filed Sept. 24, 1956 7 Sheets-Sheet 7
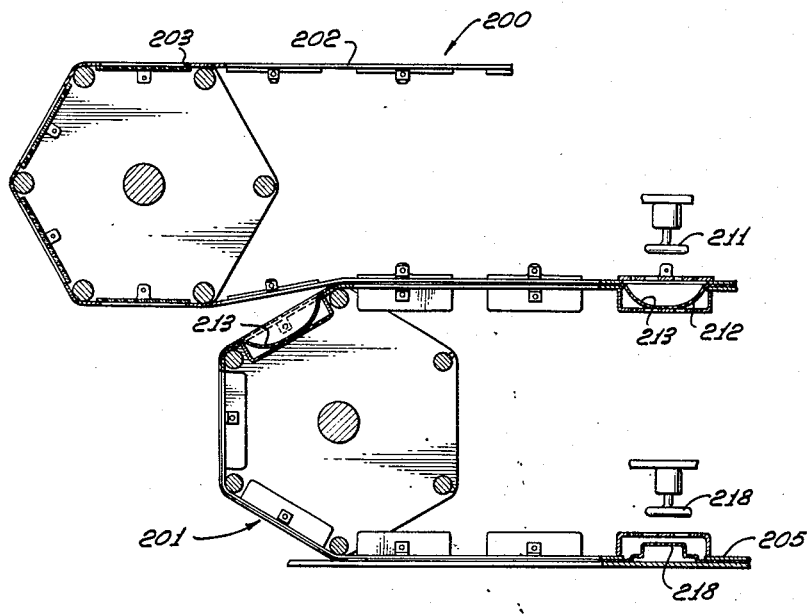
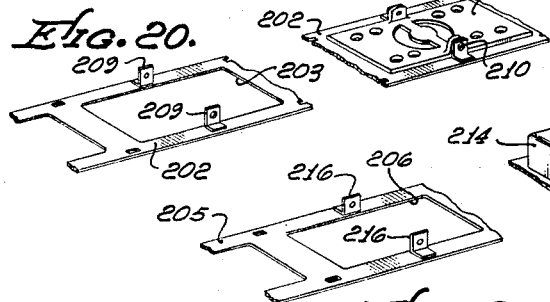
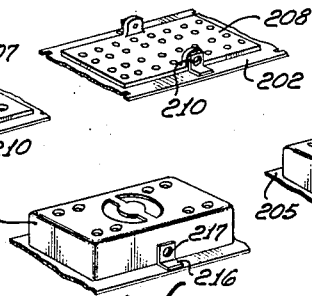
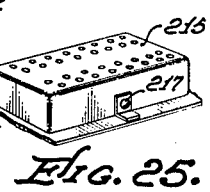
INVENTOR.
DON HEYER
BY
Paul A. Weilein
ATTORNEY.

United States Patent Office 2,927,409
Patented Mar. 8, 1960

2,927,409

METHOD OF AND APPARATUS FOR FORMING SEALED PACKAGES

Don Heyer, El Monte, Calif.

Application September 24, 1956, Serial No. 611,709

50 Claims. (Cl. 53—22)

This invention relates to the packaging of articles of merchandise in individual sealed packages.

It is an object of this invention to provide an improved method of economically packaging articles of merchandise in individual packages of novel form protectively sealing and attractively displaying such articles.

It is another object of this invention to provide a novel method of packaging articles in individual packages made from portions of a pair of sheets of packaging material, the method including the steps of advancing the sheets to a packaging station with the articles therebetween, forming pockets or cavities in one of the sheets before it is advanced to the packaging station, causing the cavities to encompass the articles, sealing together portions of the sheets surrounding the articles to form sealed packages, and then separating the sealed packages.

It is a further object of this invention to provide a packaging method such as described which includes the novel step of causing one of the sheets of packaging material to conform to and form seals around the articles contained in the packages.

It is an additional object of this invention to provide a novel packaging method, such as described, wherein a sub-atmospheric pressure is created in each sealed package for the purpose of causing portions of the package-forming material to be forced around the article contained therein.

It is another object of this invention to provide a novel method of treating deformable plastic material, which includes the step of causing the material to sag and become deformed under the influence of heat while controlling this deformation to cause the material to take on a predetermined shape.

It is another object of this invention to provide a novel packaging method such as described in which one of the packaging sheets is made of a transparent plastic material and treated to conform to the articles in the packages as well as to adhere to the portions of the sheet constituting the other part of the packages in a manner maintaining the article protectively sealed and effectively displayed therein.

Further it is an object of this invention to provide a novel and highly efficient machine for economically producing sealed packages of merchandise such as described, wherein correlated means are operable to repeatedly advance sheets of packaging material and the articles to be packaged to a packaging station, and then form the packages and remove them from the machine.

It is another object of this invention to provide a packaging machine of the character described, wherein a sheet of plastic material deformable under the influence of heat, is subjected to deforming heat by novel means for forming pockets or cavities for covering the articles to be packaged.

It is a further object of this invention to provide a machine of the character described, which includes novel means for creating within each sealed package, a sub-atmospheric pressure such that the portions of the material forming each package will be forced into conformity with and sealed around the article therein.

An additional object of this invention is to provide in a machine of the character described, novel means for controlling the application of heat to a flexible plastic material which will sag and stretch under the influence of heat, the control of this heat being such that the plastic may be made to assume shapes best suited for covering articles of different sizes and shapes in the operation of forming the packages containing such objects.

Yet another object of this invention is to provide a machine of the character described wherein a base material and a covering material, with the base material supporting the articles to be packaged, are advanced to a packaging station after the covering material has been treated to form pockets therein for encompassing the articles, and wherein the two materials are sealed around the articles, and the covering material is subjected to heat from heating means which latter in cooperation with means for producing a vacuum within the packages, causes the covering material to conform to the shape of the articles and to be sealed to the base material.

It is another object of this invention to provide in a machine such as described a novel means whereby a vacuum is produced in each package by evacuating air through porous material forming the bottom or base of each package, in a manner causing the upper covering material of the package to be forced downwardly around the article and into close engagement with the base material to form an air-tight seal around the article.

It is another object of this invention to provide in a machine such as described, means for applying to the base material an adhesive which will cause the covering material to be adhered to the base material to form a tightly sealed package during operation of the machine.

A further object of this invention is to provide a packaging machine such as described in which the packages may be made so as to fit tightly around the objects or articles or so as to loosely contain the objects or articles, in either case with objects or articles sealed in the packages.

Another object of this invention is the provision of a packaging machine wherein a novel construction and arrangement of packaging instrumentalities and a plurality of endless belts or conveyors are cooperable to repeatedly form pockets in one of the sheets, to advance the sheets with the objects to be packaged therebetween to a position in which the pockets cover the objects and the sheets are sealed together around the objects, and to release as the end product of the machine a plurality of individual sealed packages.

This invention possesses many other advantages and has other objects which may be made more easily apparent from a consideration of the embodiments of the invention shown in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 2 is an enlarged fragmentary side elevational view, partly in section of that portion of the machine shown at the right end of Fig. 1;

Fig. 3 is a vertical sectional view taken on the line 3—3 of Fig. 2, on an enlarged scale;

Fig. 4 is a sectional view taken on the line 4—4 of Fig. 3;

Fig. 5 is a fragmentary plan view of the two endless upper conveyor units shown in Fig. 2, with parts of the machine omitted for clarity of illustration of the conveyor units;

Fig. 6 is a sectional view taken on the line 6—6 of Fig. 5;

Fig. 7 is a sectional view taken on the line 7—7 of Fig. 5;

Fig. 8 is a sectional view taken on the line 8—8 of Fig. 7;

Fig. 9 is a schematic view of a particular drive means that is driven by the endless conveyor units shown in Fig. 5;

Fig. 10 is a fragmentary perspective view partly in section, showing the manner in which the plastic cover sheet extends over and progressively lowers into pockets of one of the endless conveyors, during one phase of the operation of the machine;

Fig. 11 is a fragmentary top plan view of that portion of the machine indicated between the arrows 11—11 in Fig. 2, showing how the articles to be wrapped as supported on the cardboard package forming sheet as the latter is advanced by the main conveyor;

Fig. 12 is a sectional view taken on the line 12—12 of Fig. 3;

Fig. 13 is a sectional view taken on the line 13—13 of Fig. 12;

Fig. 14 is a top plan view of that portion of the machine indicated between the arrows 14—14 in Fig. 2, showing the completely formed packages before they are severed and removed from the machine;

Fig. 15 is an enlarged fragmentary sectional view taken on the line 15—15 of Fig. 14;

Fig. 16 is a perspective view of a finished package as produced by the machine;

Fig. 17 is an enlarged side elevation partly in section of the ratchet digging dog of the indexing mechanism shown in Fig. 21;

Fig. 18 is a diagram of the electrical circuits and associated elements for effecting and controlling the operation of the machine;

Fig. 19 is a semi-schematic view of a modified form of this invention;

Fig. 20 is a fragmentary perspective view of a part of the upper endless belt shown in Fig. 19;

Fig. 21 is a perspective view of a portion of the belt shown in Fig. 20, with a heat control attachment mounted thereon;

Fig. 22 is a perspective view similar to Fig. 21, showing how another form of heat control attachment may be applied to the belt shown in Fig. 20;

Fig. 23 is a perspective view of a portion of the lower endless belt shown in Fig. 19;

Fig. 24 is a perspective view of the portion of the belt shown in Fig. 23, showing how a heat control attachment may be applied thereto; and Fig. 25 is a perspective view similar to Fig. 24, showing how another form of heat control attachment may be applied to the portion belt shown in Fig. 23.

Figure 1:
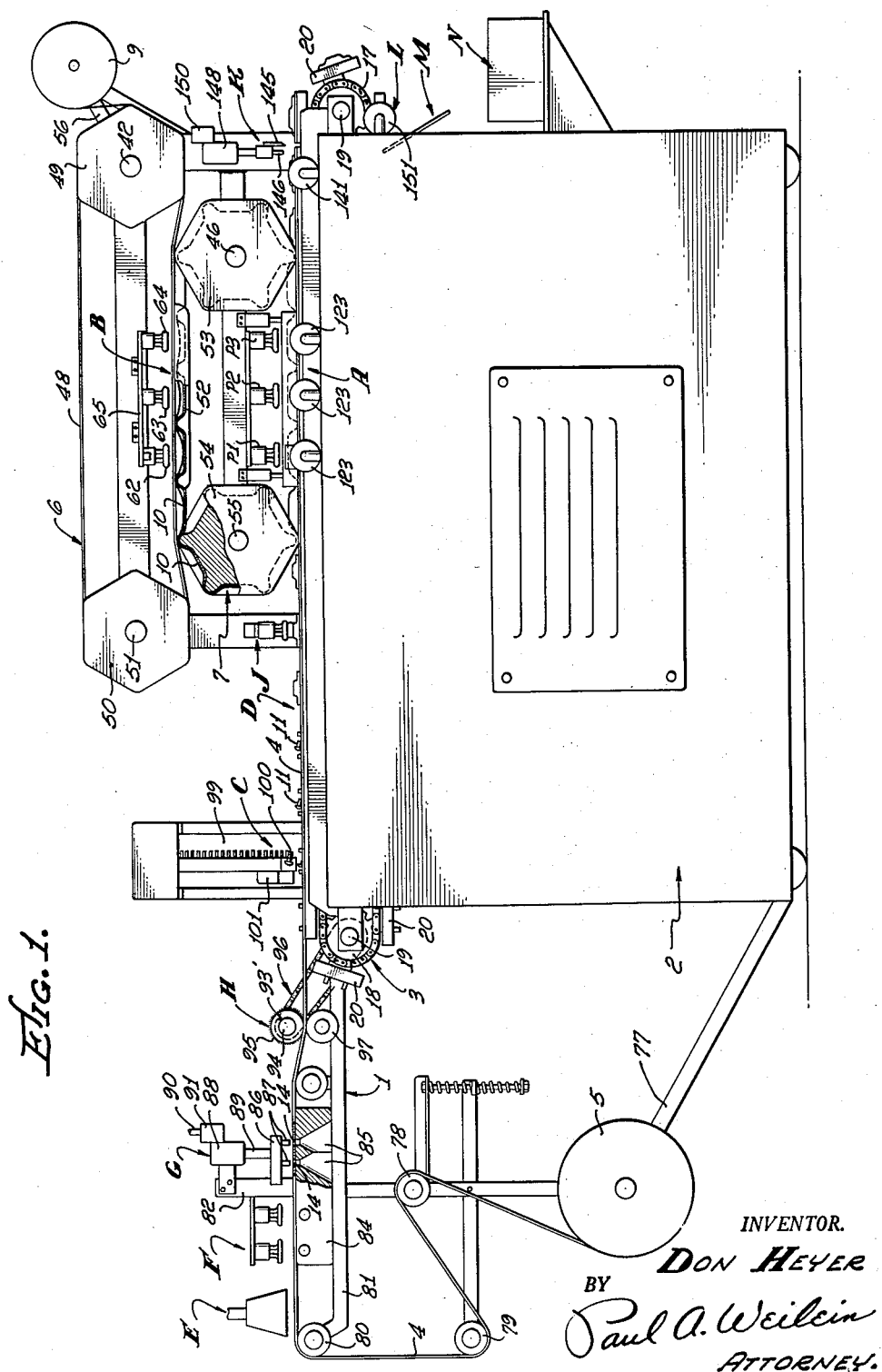
Fig. 1 is a side elevational view, partly in section of an automatic packaging machine embodying the present invention.

In carrying out the present invention, two sheets or strips of material suitable for forming packages are advanced, for example from rolls of the material, to a packaging station where the sheets overlie one another.

Before one of the sheets reaches the packaging station, objects or articles to be packaged are placed thereon in spaced relation to one another.

Before the other sheet reaches the packaging station, a series of depressions, cavities or pockets are formed therein in longitudinally spaced relation to one another.

The advance of the sheets is timed so that when they reach the packaging station, the sheet containing the cavities or pockets will be positioned so that the cavities or pockets will encompass the objects or articles. At this time, the two sheets are forced together and sealed around the objects to form a row of sealed packages joined by web portions.

While the sheets are being sealed together around the objects, pressure is applied to the upper or cover sheet to force it into contact with the objects and the bottom or base sheet. One way in accordance with this invention, in which the upper sheet effectively may be forced into contact with the object and base sheet, is to evacuate the air from the packages; in other words, to create a vacuum in each package as it is formed. After the packages are formed in this manner, they are advanced from the packaging station and severed at the web portions therebetween to form separate sealed packages.

The base or bottom sheet on which the articles or objects are placed, may be formed of cardboard or other suitable material which will form a substantial base or bottom for the packages. An adhesive is applied to the bottom sheet before the latter reaches the packaging station.

The top or cover sheet is flexible and deformable, being preferably transparent and formed of a plastic material that is stretchable and deformable under the influence of heat.

In the operation of forming the depressions or pockets in the plastic sheet, heat is applied to unsupported portions of the sheet, to cause such portions to sag. This sagging or stretching is effected by successive and controlled applications of the deforming heat, so that the pockets or depressions are progressively formed to desired size without rupturing or damaging the sheet.

During the sealing of the plastic sheet to the cardboard sheet, heat is applied to the exterior of the pockets in the plastic sheet so that the pocket-forming portions and portions surrounding the pockets are subject to being forced against the objects and cardboard sheet, respectively, as a result of the vacuum created in the packages. This treatment causes the plastic sheet to stretch and conform closely to the shape of the objects in the packages and to be adhered to the cardboard sheet. The heat may be applied and controlled as to temperature, duration, and concentration so that the plastic sheet will take the desired form without being ruptured or damaged.

It has been found that by using cardboard or similar porous material as the bottom or base sheet, the air in the packages may be evacuated through the pores of the material in such a manner that the plastic sheet will be forced to closely conform to the articles in the packages as well as to the base sheet around the articles, thereby forming neat, attractive and hermetically sealed packages.

Provision is also made for concentrating the heat to selected portions of the plastic material according to the shape and size of the object and nature of the package desired.

The desired conformity of the plastic sheet to the objects or articles in the packages and a reliable sealing of the plastic sheet to the cardboard sheet, without rupturing the plastic sheet, is assured in having the vacuum and the heat progressively applied to the packages.

Apparatus for carrying out the present invention generally includes a main endless conveyor provided with means for advancing on the upper run thereof, the cardboard sheet. In cooperation with this main conveyor are two upper conveyors which advance the sheet of plastic material so that it will overlie the cardboard sheet at a point between the ends of the main conveyor. This point constitutes the packaging station where instrumentalities are provided for effecting the packaging operation.

As the plastic sheet is being advanced between the two upper conveyors preliminary to being moved to the packaging station, it is successively treated by the application of heat, for forming therein pockets or depressions. These pockets or depressions will encompass the objects when the sheets reach the packaging station.

Means are provided at the packaging station for forcing marginal portions of the plastic sheet against corresponding and adhesive coated marginal portions of the cardboard sheet around the objects to be packaged. During this operation, air is evacuated from the packages so that atmospheric pressure will be effective to move the plastic sheet against the objects and cardboard. Heat is applied at this time whereby the plastic sheet will stretch and closely conform to the objects.

As the two sheets are intermittently advanced from the packaging station, the packages thus formed are joined by webs and these webs are severed and the packages then ejected from the apparatus.

Means are provided so that upon initiating operation of the main conveyor, the various instrumentalities and parts of the apparatus will function automatically and repeatedly so that large quantities of individual sealed packages of merchandise will be produced in a particularly efficacious manner.

Referring more specifically to the drawings, it will be seen that apparatus embodying this invention generally comprises a frame structure 1, partially enclosed in housing 2 and supporting a main endless conveyor 3. This conveyor is operated to advance on the upper run thereof to a packaging station A, between the ends of the conveyor, a sheet 4 of cardboard or similar material leading from a roll 5 of such material mounted on the frame.

Supported by the frame structure 1 above the main conveyor 3 are endless conveyors 6 and 7. The lower run of the upper conveyor 6 and the upper run of the lower conveyor 7 are opposed and cooperate to advance therebetween and toward the upper run of the main conveyor 3, a sheet 8 of flexible material. This material is fed from a roll 9 of such material, suitably mounted on the frame. The sheet 8, for example, may be made of a plastic material that is subject to stretching and deformation responsive to heat. Preferably, this material is transparent although it may be translucent or opaque.

Intermediate the ends of the opposed runs of the conveyors 6 and 7 at the pocket-forming station B are means to be hereinafter described for forming pockets, cavities or depressions 10 at intervals in the plastic sheet 8.

As shown in Fig. 1, objects or articles 11 to be packaged, may be deposited upon the cardboard sheet 4 at loading stations C and D, adjacent one end of the conveyor 3.

The lower run of the conveyor 7 and the upper run of the main conveyor 3 are opposed and cooperate to advance the sheets 4 and 8 to the packaging station A. The conveyors are timed so that when the two sheets 4 and 8 reach the packaging station A, the pockets or cavities 10 in the plastic sheet 8 will encompass the objects or articles 11. Instrumentalities, which will be hereinafter described, are operable at the packaging station A to seal the sheets together around the objects or articles 11 so as to form a row of individual packages 12 joined by webs 13 formed of adhering portions and the two sheets.

Before the carboard sheet 4 reaches the packaging station, it is treated to prepare it for the packaging operation. Accordingly, the sheet 4 passes, as shown in Fig. 1, under an applicator E which applies to the upper surface of the sheet a suitable adhesive 4' in a predetermined pattern. After leaving this applicator E, the sheet 4 passes under heating means F which dries the adhesive. Next the sheet 4 advances to punching means G which forms holes 14 therein for reception of drive pins 15 on the conveyor 3, whereby said conveyor will operate to advance the sheet 4 in properly timed relation to the plastic sheet 8. Before the sheet 4 reaches the packaging station A it is engaged by a penetrating means H which forms a series of small penetrations through the adhesive and partly through the cardboard for the purpose which will be hereinafter described. A heater J may be provided for the purpose of heating the articles or objects 11 before they reach the packaging station A, for removing moisture therefrom to preclude possibility of steaming during the packaging operation.

The row of packages after being formed as will be hereinafter fully described at the packaging station A, are advanced by the conveyor 3 to punching and severing means K which is located adjacent the discharge end of the conveyor. The means K operates to punch a hole 16 (see Fig. 16) through the webs 13 and to sever the web so that the individual packages may be removed from the conveyor. The hole 16 provides for hanging the package on a display rack or the like.

A take-off means L mounted on the frame 1 operates to remove the packages from the container as shown in Figs. 1 and 2, there being a guide chute M for directing the packages into a collection receptacle N.

The main conveyor 3 comprises an endless chain 17 mounted on sprockets 18 supported on shafts 19 suitably journalled in the frame 1. This chain carries a plurality of rectangular plates or jigs 20, each of which is pivoted as at 21 to a link of the chain, as shown in Figs. 2 and 12. An adapter plate 22 is mounted on each of the jigs 20 and detachably held thereon by means of a screw 23 and dowel pins 23' as shown in Figs. 4 and 13. The adapter plates 22 are provided with the drive pins 15 which engage in the holes 14 formed in the cardboard sheet 4 whereby the cardboard sheet will be advanced responsive to operation of the conveyor 3.

Means are provided for driving the conveyor 3 intermittently, in other words, for indexing the conveyor. This intermittent movement enables the various instrumentalities in the machine to perform their functions during the rest or dwell periods of the conveyor. As shown in Figs. 2, 3, and 17, the drive means for the conveyor 3 includes a double acting fluid-operated cylinder 25 suitably supported on the frame structure 1. This cylinder as here shown is operated by compressed air directed through lines 26 and 27 to opposite ends of the cylinder. A piston rod 28 actuated by a piston 29 in the cylinder 25, is provided with a driving head 30 on which is pivoted, as at 31, a driving dog 32. This dog is engageable with the chain 17 and a shoulder 32' on the head 30 as shown in Fig. 17, so that on the outward stroke of the piston rod 28, the upper run of the chain will be moved in a clock-wise direction looking at Fig. 2. Each outward stroke of the piston rod 28 is such that the chain 17 will be moved or indexed a distance approximately equivalent to the length of one of the jigs 20. On the return stroke of the piston rod 28, the dog 32 will swing on its pivot without driving or moving the chain 17 and ride freely over the link pins of the chain. A spring 33, connected with the head 30 and dog 32, restores the dog to driving position with respect to the chain when the piston rod 28 reaches the end of its return stroke.

A solenoid operated valve 35 (see Figs. 2 and 18) is connected with the compressed air lines 26 and 27 leading to the cylinder 25 for controlling the operation of the latter for actuating the main conveyor 3. This solenoid operated valve 35 is connected with a compressed air supply line 35a and is controlled by an electrically operated timer 36 (see Fig. 18), associated elements and electric circuits to be hereinafter described, so that the conveyor 3 is stopped for a predetermined period of time between each indexing or advancing movement. The conveyors 6 and 7 are similarly indexed, as they are driven by the main conveyor 3 and therefore operate in the desired timed relation to the main conveyor.

Figs. 2 and 9 show one form of drive means whereby the conveyors 6 and 7 are driven by the main conveyor 3, the showing in Fig. 9 being schematic. The lower run of the chain 17 of the conveyor 3 drives a gear 37 fixed to a shaft 38 rotatably supported on the frame 1. This shaft through beveled gears 39 drives a vertical shaft 40, likewise journalled, on the frame 1. Gears 41 provide a drive connection between the shaft 40 and a shaft 42 for driving the conveyor 6. Gears 43, a short shaft 44 and gears 45, also provide a drive connection between the shaft 40 and a shaft 46 for driving the lower conveyor 7, the shaft 44 and 46 being supported by the frame 1. With this arrangement, the conveyors 6 and 7 are operated in the desired timed relation to the operation of the main conveyor 3.

The conveyor 6 includes an endless belt 48, mounted on polygonal pulleys 49 and 50. The pulley 49 is mounted on the shaft 42 so as to drive the belt 48. The pulley 50 is mounted as an idler on a shaft 51 supported on the frame 1.

The conveyor 7 includes an endless belt 52 mounted on polygonal pulleys 53 and 54. The pulley 53 is mounted on the shaft 46 for driving the belt 52, whereas the pulley 54 is mounted as an idler on a shaft 55 supported on the frame 1.

The lower run of the belt 48 of the conveyor 6 contacts the upper run of the belt 52 of the conveyor 7 except when the plastic material 8 is fed between these runs. The roll 9 of plastic material is supported on a post 56 extending upwardly from the frame 1. The plastic material 8 is unrolled from the roll 9 and led between the opposed runs of the conveyors 6 and 7 so as to be frictionally gripped therebetween. As the belt 48 of the upper conveyor 6 rotates in a clock-wise direction, and the belt 52 of the lower conveyor 7 rotates in a counter clock-wise direction, the opposed runs of these conveyors will advance in the same direction, whereby the sheet 8 of plastic material will be advanced toward the pulleys 50 and 54 at the left ends of the conveyors as seen in Fig. 2.

In order that the means for forming pockets or depressions 10 in the plastic sheet 8 at the station B may be operative while this sheet is disposed between the opposed runs of the conveyors 6 and 7, the belts 48 and 52 of these conveyors are especially constructed. The belt 52 for the conveyor 7 is formed with a series of cup portions 58, the pulleys 53 and 54 having depressions 59 therein to accommodate these cup portions 58. The sheet 8 of plastic material extends flatwise over the cup portions 58, being supported on the flat portions 60 of the belt disposed between the cup portions. The portions of the sheet 8 which overlie the cup portions 58 are unsupported and will sag into the cup portions under the influence of heat, so as to form the pockets 10.

The means for forming the pockets 10 in the plastic sheet 8 at the pocket-forming station B, as here shown, comprises heaters 62, 63 and 64 arranged in a row above the belt 52 on a frame member 65. These heaters are here shown, as electrically operated and are in such proximity to the sheet of plastic material 8 advanced between the conveyors 6 and 7 as to cause the aforesaid sagging deformation of the sheet for progressively forming the pockets 10. Fig. 2 indicates how the pockets are progressively formed as the sheet 8 is advanced. The cup portions 58 in the conveyor 7 limit the sagging deformations of the sheet to form pockets of a depth, width and length corresponding to the depth, width and length of the cup portions 58.

It may be desired to concentrate the application of heat from the heaters 62, 63 and 64 to selected portions of the plastic sheet 8 in the operation of forming the pockets 10, for the purpose of varying the shape and dimensions of the pockets best to suit the particular articles or objects to be packaged.

One way in which the pocket forming heat may be concentrated on selected portions of the plastic sheet 8 in forming the pockets 10 consists in providing openings 67 of desired shape in the belt 48 of the conveyor 6 as well as providing for the shifting the belt laterally and longitudinally. With this arrangement, heat from the heaters 62, 63 and 64 will pass through the belt openings 67 so that it may be concentrated on selected portions of the sheet 8.

Figs. 5-8 show how the belt 48 of the conveyor 6 may be adjusted laterally and longitudinally with respect to the belt 52 of the conveyor 7. For this purpose, the drive pulley 49 is splined on the shaft 42 so that it may be shifted thereon to laterally adjust the belt 58, there being a set screw 69 to hold the pulley in adjusted position. The idler pulley 50 may be correspondingly adjusted on its shaft 51 and held in adjusted position by a set screw 70.

Longitudinal adjustment of the belt 48 of the conveyor 6 relative to the belt 52 of the conveyor 7 is provided by turning the pulleys 49 and 50 relative to the shafts 42 and 51. This adjustment makes it possible to position the openings 67 in the belt 48 for concentrating the deforming heat on selected portions of the plastic sheet 8.

Figs. 7 and 8 show how the pulleys 49 and 50 may be angularly adjusted relative to their respective shafts. Angular adjustment of the drive pulley 49 relative to the shaft 42 is effected by loosening the set screw 70 and turning the pulley relative to a separate hub 71 therefor, this hub being splined on the shaft 42 and provided with an annular flange 72 having arcuate slots 73 therein. Screws 74 extend through the slots 73 to connect the flange 72 with the pulley 49. Upon loosening the screws 74, the pulley 49 may be adjusted angularly relative to the hub 71 and shaft 42, after which these screws are tightened to maintain the desired adjustment of the pulley 49 and belt 48.

The belt 52 of the conveyor 7 may also be adjusted longitudinally and laterally for concentrating heat applied, as will be hereinafter described, to the pockets 10 in the plastic sheet at the packaging station A. The drive pulley 53 for the belt 52 is adjustably mounted on the shaft 46 by means 75 (see Fig. 2) corresponding to the adjustable means shown in Figs. 7 and 8 for adjustably mounting the pulley 49 for the belt 48. The idler pulley 54 is adjustably mounted on the shaft 55 by means 76 (see Fig. 2) corresponding to the adjustable means shown in Fig. 6 for mounting the idler pulley 50.

The belt 52 of the conveyor 7 may be adjusted laterally or longitudinally and laterally for concentrating the heat applied for deforming the plastic sheet in forming the pockets 10. This adjustment may be made without adjusting the belt 48 or in combination with an appropriate adjustment of the belt 48. This longitudinal and lateral adjustment of the belt 52 of the conveyor 7 makes it possible to concentrate heat to selected portions of the plastic sheet at the pocket forming station or at the packaging station or at both of these stations.

If desired, the cup portions 58 in the belt 52 of the conveyor 7 may, as here shown, be provided with openings or slots 58a which will provide for a greater nicety of concentration of the heat applied to the cups 10 at the packaging station A. Heat is applied to the plastic sheet 8 at the packaging station A from a series of electric heaters $P_1$, $P_2$ and $P_3$, mounted on the frame 1 over the lower run of the belt 52 of the conveyor 7 as shown in Figs. 1 and 2.

As shown in Fig. 1, the roll 5 of cardboard 4 is supported on a bracket structure 77 extending from one end of the housing 2 for the main frame 1. The cardboard 4 extends from the roll 5 thereof over a spring-loading tensioning roller 78 or bracket structure 77, thence under an idler roller 79 and over a guide roller 80 on an end extension 81 of the frame 1. From the guide roller 80, the cardboard extends horizontally to the upper run of the main conveyor 3.

The adhesive applicator E extends over the run of the cardboard sheet 4 adjacent to guide roller 80 and may constitute any suitable means for spraying or otherwise applying an adhesive coating to the cardboard sheet.

The heating means F, for partially drying the adhesive, is supported on a bracket structure 82 extending upwardly from the extension 81 of the frame 1. This bracket structure also supports the means G for punching the holes 14 in the cardboard 4. Beneath the means G on the extension 81, is a block 84 over which the cardboard 4 is extended. Holes 85 in the block 84 accommodate the punching elements of the means G.

The punching means G comprises a punching head 86 having a pair of punches 87 thereon adapted to punch the holes 14 in the cardboard, as here shown, the punching head 86 is moved into and from punching position by means of a cylinder 88 and a piston 89 on which latter the head 86 is mounted. The piston 89 is operated by compressed air supplied to the cylinder 88 through a conduit 90 (see Fig. 18) for connection with a source of compressed air not shown. A solenoid-operated valve 91 on the cylinder 88 controls the application of compressed air to the cylinder 88 for reciproacting the piston 89 and punching head 86. The valve 91 is controlled in a manner which will be hereinafter described, to operate the punching means G in the desired timed relation to the indexing of the conveyors 3, 6 and 7.

The means H for making a series of penetrations or pricks 93 partly through the cardboard 4 comprises a roller 93' mounted on a shaft 94 supported in bearings or the frame extension 81. The roller 93' is provided with a series of small sharp punch members 95 adapted to make the series of penetrations partly through the cardboard. A chain and sprocket drive means 96 drives the roller 93 and is driven by the main conveyor 3 as shown in Fig. 1. A pressure roller 97 is mounted on the extension frame 81 beneath the roller 93 so that as the cardboard passes between these rollers the penetrations will be made therein.

At the loading station C, a hopper mechanism 99 is provided for depositing small parts such as screws or the like onto the cardboard. This hopper mechanism may be operated in any suitable manner. However, it is here shown (see Fig. 1) as having a valve means 100 which is actuated by a solenoid or similar electrically operated element 101, to release one or more of the small parts with each operation, such parts gravitating onto the cardboard 4, when released. The electrically operated valve means of this hopper mechanism is controlled in a manner to be hereinafter described.

Referring now to the packaging station A, it will be apparent with reference to Fig. 2 that when the main conveyor 3 advances the cardboard sheet 4 with the articles 11 thereon beneath the idler pulley 54 of the conveyor 7, the sheet 8 of plastic material has also been advanced so as to overlie the cardboard sheet. As the advance of these sheets continues toward the station A, the pockets 10 in the plastic sheet will encompass the articles or objects 11 on the cardboard sheet.

Means are provided at the packaging station A for forcing the plastic sheet 8 downwardly against the adhesive coated surface of the cardboard sheet 4, as each portion of the sheet 4 carrying an article 11 reaches the packaging station. This means includes a vertically movable rectangular pressure applying frame 101 having side and end bars 102 and 103 and cross bars 104. These bars are spaced one from the other so that when they are moved downwardly onto the belt 52 of the conveyor 7 which overlies the plastic sheet, they will press the belt against longitudinal marginal portions of the plastic sheet alongside the pockets 10, as well as against the transverse portions of the plastic sheet between the pockets, thereby forcibly pressing the plastic sheet against corresponding portions of the cardboard sheet 4. During this operation the cup portions 58 overlie the plastic sheet. This assures that the plastic sheet will be adhered to the cardboard sheet around the objects 11 encompassed by the pockets 10, to thereby form sealed packages. The vertically movable frame 101, as here shown is formed so as to press the plastic sheet 8 down around three of the pockets 10 although it is obvious that it may be made to encompass a lesser or greater number of pockets as desired. Thus, in its present form, the frame 101 applies a downward pressure three times around each package 12 inasmuch as the packages are intermittently advanced in the indexing operation of the conveyor 3. This successive application of pressure assures that the sheet 8 will be securely adhered to the cardboard sheet 4.

As shown in Fig. 2, the frame 101 is raised and lowered by means of a pair of cylinder and piston units 106 supported on a horizontal member 107 of the frame 1. These piston and cylinder units are operated by compressed air supplied thereto by means of conduit lines 108 and 109 leading from a solenoid operated valve 110. Compressed air is supplied to the valve 110 through a conduit 111 from a suitable source not shown. The valve 110 operates in a manner which will be hereinafter more fully described, to actuate the cylinder units 106 so as to lower the pressure-applying frame 101 against the sheet 8 of plastic material and raise this frame during the dwell or stationary periods of the intermittently operated conveyors 3, 6 and 7.

The means provided at the packaging station A for causing the flexible plastic sheet 8 to be forced into engagement with and conformation to the objects to be packaged, in other words, for creating a vacuum in the packages, is operable while the pressure-applying frame 101 is pressed down upon the sheet 8. This means includes three suction nozzles 112 for cooperation with passage means 113 formed in the jigs 20 and plates 22 of the endless conveyor 3. The passage means 113 including the tubular pins 15, afford communication of the nozzles 112 with the interior of the packages in a manner hereinafter fully described. The nozzles 112 are arranged and operated to communicate the passage means 113 with a source of vacuum or sub-atmospheric pressure, not shown, when the frame 101 encompasses one or more of the jigs 20. As here shown, the nozzles are simultaneously communicated with the passage means 113 of three jigs 20 when the pressure-applying frame 101 forces the packaging sheet 4 and 8 together to form seals around the objects to be packaged. This operation is effected while the conveyors 3, 6 and 7 are at rest. The nozzles 112 are withdrawn from communication with the passage means 113 of the jigs 20 before the next advancing movement of the conveyors 3, 6 and 7 is effected.

When the nozzles 112 communicate with the passage means 113, as above noted, a sub-atmospheric pressure is created in the packages at the packaging station A. This causes the atmospheric pressure exteriorly of the pockets 10 to force the plastic sheet into close conformity with the object to be packaged, as well as into contact with the cardboard sheet 4, so that a reliable seal is formed around the object.

Each package 12 formed at the station A is subjected to this vacuum treatment repeatedly as it is advanced intermittently past the packaging station, there being in the present instance, three such treatments for each package. This repeated treatment assures that the plastic sheet 8 will be forced into the desired close conformity to the objects 11 and against the cardboard sheet 4, without tearing or rupturing the plastic sheet and so as to provide an effective seal around the object.

Referring more specifically to the passage means 113 in each jig 20 and associate plate 22, it will be seen with reference to Figs. 3, 4, and 11–13, that each jig 20 is provided with an intake port 114 extending transversely thereof with one end tapered and open on a side edge of the jig for reception of the tapered outer end of a nozzle 112. The other end of the port 114 opens upwardly through the upper face of the jig 20 so as to communicate with a groove 115 extending longitudinally in the under side of the plate 22. The tubular drive pins 15 are mounted on the adapter plate 22 and are tubular.

The bores of these pins comprise portions of the passage means 113 being communicated at their lower open ends (see Figs. 12 and 13) with the groove 115. The upper open ends of the pins 15 are adapted to communicate with the interior of the pockets 10 in the plastic sheet 8 when these pockets encompass the objects to be packaged, as will be apparent with reference to Figs. 2 and 3.

A more effective evacuation of the air from the packages at the packaging station A is provided for by means of angular end extensions 116 of the groove 115 in the plates 22 (see Figs. 11, 12 and 13). These extensions communicate with vertical ports 117 in the plate 22, these ports opening on the upper sides of the plates 22 into a series of crossing and intersecting grooves 118 in the upper side of the plates 22. The grooves 118 cause air to be evacuated from the packages through the pores of the cardboard 4, whereby a vacuum will be created throughout the spaces between the plastic sheet 8 and the cardboard sheet 4. This assures that the plastic sheet will be forced into desired close relationship and conformity to the objects 11 and the cardboard sheet 4.

At this point, it should be noted that the tubular pins 15 serve as a means for holding the objects to be packaged in the desired position on the cardboard sheet 4. Permanent magnets 120 may also be fixed on the plates 22 for holding small objects such as the screws (see Fig. 14) in the desired position on the cardboard sheet. The large objects to be packaged, as here shown have holes therein and the pins 15 extend into these holes with their upper ends below the upper ends of the holes. In this connection, it should be noted, that the pins 15 or other means may be placed and spaced as desired on the plates 22 for holding objects not having holes or depressions to receive the pins, and for holding objects of particular shapes and sizes in the desired position on the cardboard sheet, provided the pins or other means are extensible through the cardboard sheet and serve the purposes of the pins 15 here shown.

The plates 22 and jigs 20 are provided with aligned holes 121 to accommodate the punch element of the means K for punching the holes 16 in sealed end portions of the packages.

Means are provided for moving the nozzles 112 into and from communication with the passage means 113 in the jigs 20 at the packaging station A while the conveyors 3, 6 and 7 are at rest. Accordingly the nozzles 112 serve as piston rods for pistons 122 in cylinder 123 (see Fig. 3) suitably mounted on the frame structure 1. These nozzles extend through the pistons 122 and stuffing boxes 124 at both ends of the cylinders 123. The end of each nozzle 112 opposite the end adapted to communicate with the passage means 113 is coupled to a flexible conduit 125 leading from a vacuum pump or source of subatmospheric pressure not shown.

The piston 122 and nozzle 112 in each cylinder 123 are reciprocated as a unit to move the nozzle into and from operative position. Compressed air is supplied to the cylinders 123 through an electro-magnetically operated valve 110 (see Figs. 3 and 18). Air under pressure enters the chamber 128 of the valve unit 110 through the conduit 111 leading from a source of compressed air not shown. From the chamber 128 air passes through ports 130 and 131 into the ends of one of the cylinders 123, as shown in Fig. 3, according to the operation of the reciprocable valve member 132 of the valve unit 110. The valve unit 110 is connected by conduits 133 and 134 to opposite ends of the other two cylinders 123, as shown in Fig. 18. The valve member 132 acts as an armature between coils 135 and 136 and is held by said coils in positions to introduce air for reciprocating the pistons 122. With this arrangement of the valve unit 110 and conduits 133 and 134, the three cylinders 123 at the packaging station A are simultaneously correspondingly operated whereby the pistons 122 and nozzles 112 are simultaneously moved to position the nozzles within and remove them from the intake ports 114 in the jigs 20. The electrically operated timer 36 shown in Fig. 18 controls the operation of the valve unit 110 for the three cylinders 123, in a manner to be hereinafter described.

The flexible conduits 125 as shown in Fig. 18 are coupled to a vacuum supply line 138, in turn connected to a line 139 leading from a source of vacuum not shown. A solenoid operated valve 140 mounted in the line 119 opens and closes this line in a manner to be hereinafter described.

A cylinder 141 corresponding to the cylinder 123 is suitably mounted on the frame 1 adjacent the severing and paneling means K. This cylinder is connected with the conduits 133 and 134 and operated simultaneously with the three cylinders 123. It is operated to move a piston rod 142 into and from engagement with the port 114 in each jig 20 that reaches a position where the web 13 between two packages 12 is to be severed and punched by the severing and punching means K. The rod 142 need not be tubular and connected to the source of vacuum, as it serves only to hold the jigs 20 in position to assure that the severing and punching operation will be at the proper point in the web 13 between the packages 12. With this arrangement, the packages 12 will be properly separated and punched to provide the hole 16 in a sealed marginal portion of each package.

The severing and punching means K comprises as shown in Fig. 2, a head 144 mounting a severing blade 145 and a punch 146. A piston rod 147 supports the head 144 and is connected with a piston 147' mounted in a cylinder 148 supported on the frame 1 in any suitable manner. A compressed air line 149 leads to an electromagnetically operable valve unit 150 on the cylinder 148 for controlling the flow of compressed air into the cylinder, the source of compressed air (not shown) being the same as that supplying compressed air to operate the other cylinder of the machine. The cylinder 148 is operated in a manner hereinafter described, to move the blade 145 and punch 146 into and from operative position during each dwell period of the main conveyor 3.

The take-off means L comprises a cylinder 151 mounted on the frame 1 below the discharge end of the main conveyor 3. This cylinder operates a piston (not shown) and a piston rod 152 for removing the packages 12 from the jigs 20 so that the packages will gravitate into the collection receptacle N as shown in Fig. 1.

The cylinder 151 is connected with the compressed air conduits 133 and 134 so that it is operated simultaneously with the cylinders 123 and 141. The piston rod 152 is tubular and adapted to be moved into and out of the intake ports 114 of the jigs 20 in the same manner as the nozzles 112 in the three cylinders 123, when the jigs are moved around the discharge end of the conveyor 3 and come to rest opposite the rod 152 during the dwell periods of the conveyor. Compressed air is supplied to the tubular rod 152 through flexible conduit 154 coupled to a compressed air supply line 155. An electro-magnetically operated valve 156 in the line 155 is controlled by the timer 36 so that when the piston rod 152 is connected with the port 114 of a jig 20, compressed air will be directed through the passage means 90 in the jig and into the package 12 so as to dislodge the package from the jig. The dislodged package will then gravitate into the collection receptacle N.

Fig. 18 shows electric circuits and associated control elements whereby the machine may be continuously operated with the various instrumentalities thereof functioning in proper timed relation one to the other in accordance with this invention. Leading from a main switch 158 to which electrical energy is supplied by the line wires 159 and 160 from a suitable source, not shown, are conductors 161 and 162 comprising the main circuit. This main circuit includes a spring loaded foot switch 163 and the electrically operated timer 36. The foot switch 163 and the timer are connected in series in the conductor 161 so that as long as the foot switch 163 is closed, the timer is energized and will control the circuits for the other electrically operated units of the machine. Upon release of pressure on the foot switch the spring means thereof will move the switch into position to open the circuit for the timer.

Conductors 165 and 166 connected to the main circuit conductors 161 and 162 provide a circuit for the heaters 62, 63 and 64 at the pocket forming station B, there being an adjustable thermostatic control unit 167 connected in this circuit, for each heater.

The heater J is connected by conductors 168 and an adjustable thermostatic control unit 169 with the main circuit conductors 161 and 162.

The heaters F are connected to the main circuit conductors 161 and 162 by means of the conductors 170 and adjustable thermostatic control units 171.

The heaters $P_1$, $P_2$ and $P_3$ at the packaging station A are connected with the main circuit conductors 161 and 162 by the conductors 172 and 166, there being an adjustable thermostatic operated control 173 for each of these heaters.

It will now be apparent that all of the heaters in the machine operate independently of the timer 36, being energized from the main circuit conductors 161 and 162 when the switch 158 is closed, each heater being controlled by its related adjustable, thermostatically operated unit which may be adjusted as desired to determine the operation of the heater.

As shown in Fig. 18, the electrically operated valve 91 for the punching means G is connected by a conductor 174 to the main circuit conductor 162. A relay circuit 175 including a relay 176 is arranged to connect the electrically operated valve 91 to the other main circuit conductor 161 through a conductor 177, the spring loaded switch 178 and a conductor 179 leading from the switch 178 to the timer 36, which latter is operable to complete the circuit. However, it should be noted that in series with the conductor 177 are normally open micro switches 180, there being one of these micro switches associated with each of the cylinders 123 and the cylinder 141. Thus the cylinder 88 for operating the punch element 87 will not be operated until the micro switches 180 and the switch 178 are closed.

The relay circuit 175 is normally closed by the relay 176 so that the valve 91 will direct compressed air into the cylinder 88 for moving the piston rod 89 and punch elements 87 downwardly to punch the holes 14 in the plastic sheet when the switches 178 and 180 are closed. On this down stroke, of the piston rod 89 an arm 182 thereon engages the armature 176' of the relay 176 and moves the relay into a position in which it is locked in a circuit closing position such that the valve 91 operates to retract or lift the piston rod 89. This action of the relay 176 and valve 91 causes the punching element 87 to move quickly into and from the position for forming the holes 14 in the sheet 4 during the dwell of the conveyor 3. The relay 176 returns to the particular circuit closing position shown in Fig. 18, when the switch 178 is moved into the particular circuit closing position shown in Fig. 18.

The electrically operated means 101 for the valve 100 for releasing small parts from the hopper 99 is connected with the conductors 174 and 177 leading to the punching device G by means of the conductors 183 and 184, so that the small parts will be released at the same time the punching means G is operated.

The valve unit 150 of the severing and punching means K is connected to the main circuit conductor 161 and 162 through the conductor 177' and 185 respectively. A relay circuit 186 and relay 187 corresponding to the relay circuit 175 and relay 176, is connected with the electrically operated valve 150 and conductors 177' and 185, so as to operate in the same manner and at the same time as the relay circuit 175 and relay 176. Accordingly, the cylinder 148 is operated to move the piston rod 147 so that the severing blade 145 and punch 146 are moved into and out of operative position during dwell periods of the main conveyor 3.

The timer 36 is connected by means of conductors 188 and 189 with the electrically operated valve 35 for controlling the operation of the cylinder 25 for indexing the main conveyor 3. When the main switch 158 and the foot switch 163 are closed the timer is energized and through the conductors 188 and 189 operates the electrically responsive valve 35 to introduce compressed air into the cylinder 45 for effecting the driving stroke of the piston rod 28.

This driving stroke as previously described moves the conveyor 3 a distance equal to the length of one of the jigs 20. When this movement of the piston rod 28 is completed the switch 178 is moved by the piston rod 28 from the position shown in Fig. 18 into its second circuit closing position which couples conductor 177 through the conduit 179 with timer 36 and the other main circuit conductor 161 leading into the timer. This action of the switch 178 closes a circuit for the electrically operated valve 110 through the timer 36, conductor 179, conductor 177, a conductor 190 leading from conductor 177 to the valve 110 and a conductor 191 leading from valve 110 back to the main circuit conductor 162. The valve 110 now causes compressed air to enter the cylinders 123, 141, and 151, so that the piston rods 112, 142 and 152 are simultaneously moved into the intake ports 114 of the jigs 20 (see Fig. 3) then disposed opposite these rods. When the rods 112 and 142 become seated in the ports 114 of the jigs 20, arms 193 on these rods move into contact with and close all of the micro switches 180 connected with the conductor 177. Fig. 3 shows how the arms 193 will engage and close the switches 180 suitably mounted on the frame 1. The timer 36 is set to maintain for a predetermined time, the valve 35 in position to hold the piston 28 in extended position thereby maintaining the valve 178 in circuit closing position for the circuit including the micro switches 180. Likewise, the piston rods 112 and 142 are maintained during this predetermined time, in extended position holding the micro switches 180 in circuit closing position, inasmuch as the valve 110 is also maintained for this predetermined time in a position to hold the piston rods 112 and 142 extended.

When the micro switches 180 are held closed, the circuit for the valve 91 of the punch means G, also the circuit for the valve 150 of the severing and punching means K is closed whereby compressed air from the valve 110 will flow to and operate the cylinders 88 and 148 to actuate the means G and K. At the same time that the valve 110 actuates these cylinders 123, 141 and 151, the compressed air flows through the lines 108 and 109 to actuate the cylinders 106 to push to frame 109 down over the plastic sheet 8 at the packaging station as hereinbefore described.

In addition to the foregoing operations taking place during the dwell period of the conveyors 3, 6 and 7 a vacuum is created in the packages 12 at the packaging station A. This is accomplished by the actuation of the electrically operated valve 140 in the vacuum supply line 139. The valve 140 is connected in series with the micro switches 180 so that when the latter are closed the vacuum control valve 140 will open whereby a vacuum will be drawn through the piston rods 112 the packages 12 as hereinbefore described to complete the packaging operation.

The electrically operated valve 156 is also connected in series with the micro switches 180 and operates during the dwell period of the conveyors, to open so that air under pressure may be applied to dislodge the packages 12, as previously described, at the discharge end of the conveyor 3.

At the end of the dwell period of the conveyors 3, 6 and 7, the timer 36 operates the valve 35 to reverse the flow of compressed air to the cylinder 25 whereby the piston 28 will be retracted. Upon this movement of the piston 28 the switch 178 moves back to the position shown in Fig. 18, thereby closing the circuit for operating the valve 110 to reverse the flow of compressed air to the cylinder 123, 141 and 151, rods 112, 142 and 152 are retracted thereby opening the micro switches 180. Next, the timer 36 functions to again actuate the valve 35 for effecting an indexing stroke of the piston 28, so that another cyclical operation of the machine may be effected. As long as the operator holds the switch 163 closed the machine will continue its cyclical operation, under control of the timer 36.

A modified form of this invention as shown in Figs. 19-25 relates to conveyors 200 and 201 which may be used in place of the upper conveyors 6 and 7 shown in Figs. 1, 2 and 3. The conveyors 200 and 201 may be mounted, adjusted and operated in the same manner as the conveyors 6 and 7. The upper conveyors 200 is provided with an endless belt 202 having a series of rectangular openings 203, here shown of a length and width and spacing corresponding substantially to that of the jigs 20 on the main conveyor shown in Figs. 1, 2 and 3. The endless belt 205 of the lower conveyor 201 is provided with openings 206 corresponding to the openings 203.

Heat control plates 207 and 208, as shown in Figs. 21 and 22, differing as to the arrangement of openings therein are adapted to be detachably mounted on the belt 202 by means of the lugs 209 and fastenings 210, so that the heat from heaters 211 corresponding to the heaters 62, 63 and 64, may be directed and concentrate onto the plastic sheet 212 as desired, in the operation of forming the pockets 213 in this sheet. The use of the plates 207 or 208 is optional.

The belt 205 of the lower conveyor 201 is adapted to have recepacle like members 214 or 215 detachably mounted thereon over the openings 206 by means of the lugs 216 and fastenings 217. The members 214 and 215 act in the manner of the cup portions 58 on the belt of the conveyor 7, to control the formation of pockets 218 in the plastic sheet. In addition the members 214 and 215 have openings therein of various forms and location whereby the heat from heaters 218 corresponding to the heaters $P_1$, $P_2$ and $P_3$ may be concentrated on the plastic sheet as desired at the packaging station in causing the plastic sheet to be sealed and to conform to the object being packaged.

I claim:

1. A method of packaging articles in sealed packages formed by portions of a pair of elongated sheets of packaging material, one of which is flexible, including the steps of: advancing the flexible sheet toward a packaging station; forming depressions in said flexible sheet before the latter reaches said station; advancing the other sheet toward said station; placing objects to be packaged on said other sheet before it reaches said station; continuing the advance of said sheets to said station in timed relation to cause said depressions to encompass said objects; sealing said sheets together around said objects to form separate sealed packages; after said sealing thereof creating within said packages a sub-atmospheric pressure which will cause portions of said flexible sheet to be forced against said objects; then removing said packages from said sheets.

2. A method of packaging objects in sealed packages formed by portions of a pair of elongated sheets of packaging material, one of which is flexible, including the steps of: advancing the flexible sheet toward a packaging station; advancing the other sheet toward said station; placing objects to be packaged on said other sheet before said other sheet reaches said station; continuing the advance of said sheets to position the flexible sheet over the objects and said other sheet at said station; sealing said sheets together to form a continuous seal surrounding said objects to thereby form separate packages; creating within said separate packages after said sealing thereof a sub-atmospheric pressure which will cause portions of said flexible sheet to be forced into contact with said objects; and then removing said packages from said sheets.

3. A method of packaging objects in sealed packages formed by portions of a pair of elongated sheets of packaging material, one of which is flexible and the other of which is porous, including the steps of: advancing the flexible sheet toward a packaging station; advancing the porous sheet towards said station; placing objects to be packaged on said porous sheet before said sheet reaches said station; continuing the advance of said sheets to cause the flexible sheet to overlie the porous sheet and the objects thereon at said station; sealing together portions of said sheets which surround said objects to form separate packages; evacuating air from said packages after said sealing thereof through said porous sheet to create a sub-atmospheric pressure in said packages whereby portions of the flexible sheet are forced against said objects; then removing said packages from said sheets.

4. A method of packaging objects in sealed packages formed by portions of elongated sheets of packaging material, one of which is flexible and will sag under the influence of heat, including the steps of: advancing toward a packaging station said flexible sheet; applying heat at intervals along said flexible sheet to gravitationally cause it to sag and form series of cavities before it reaches said station; advancing the other sheet of packaging material toward said station; placing objects on said other sheet; continuing the advance of said sheets so that said objects will be encompassed by said cavities when said sheets reach said station; and sealing said sheets together around said objects therebetween to form individual packages.

5. A method of packaging objects in sealed packages with portions of a pair of sheets of packaging material, one of which is deformable responsive to heat, including the steps of: advancing such sheets to a packaging station so that one sheet overlies the other at said station; subjecting said deformable sheet to a deforming heat at intervals thereon before the sheet reaches said station in a manner to cause the heated portions to sag gravitationally; controlling the deformation of said sheet to form therein a series of depressions before the sheet reaches said station; placing objects on the other sheet before it reaches said station in position to be encompassed by said depressions when said sheets reach said station; and sealing said sheets together along margins thereof and between said objects to form individual packages.

6. A method of packaging objects in sealed packages formed of portions of a pair of sheets of packaging material, one of which is deformable responsive to heat, including the steps of: intermittently advancing said sheets to a packaging station so that one sheet overlies the other at said station; subjecting the deformable sheet when at rest to a deforming heat at intervals thereon before the sheet reaches said station in a manner to cause the heated portions to sag gravitationally; controlling the deformation of said sheet to provide in spaced relation thereon a series of depressions; placing objects on the other sheet in position to be encompassed by said depressions when said sheets reach said station; sealing said sheets together around the objects therebetween to form individual packages; and then severing said packages from said sheets.

7. A method of packaging objects in sealed packages formed of a pair of sheets of packaging material one of which will sag under the influence of heat, including the steps of: advancing such sheets to a packaging station so that one sheet overlies the other at said station; subjecting said deformable sheet to a deforming heat which will cause said sheet to sag gravitationally at intervals thereon to form depressions therein before said sheet reaches said station; controlling the heat to regulate the sagging of said deformable sheet; placing objects on the other sheet before it reaches said station in position to be covered by said depressions when said sheets reach said station; sealing said sheets together along margins thereof and between said objects to form individual packages; and severing said packages from said sheet.

8. A method of packing objects in sealed packages with the use of sheets of material one of which is flexible, which includes the steps of: advancing said sheets to a packaging station so that said flexible sheet overlies the other sheet at said station; forming in said flexible sheet before it reaches said station a series of depressions, placing objects upon the other sheet in advance of said station in a position to be covered by said depressions when said sheets reach said station; sealing said flexible sheet to the other sheet around said objects to form individual packages; and repeatedly creating a vacuum within each package after the sealing thereof to force the flexible sheet portion of each package against the object therein.

9. A method of packaging objects in sealed packages including the steps of: advancing to a packaging station a sheet of flexible packaging material which will sag under the influence of heat; repeatedly applying heat at intervals along said sheet to cause the same portion of said sheet to sag with each heat application and progressively form each of a series of cavities before the sheet reaches said station; advancing a second sheet of packaging material to said station so that said second sheet lies beneath said flexible sheet at said station; placing objects on said second sheet in position to be encompassed by said cavities when said sheets reach said station; forcing portions of said flexible sheet into conformity with the objects in said cavities; and sealing said flexible sheet to the other sheet around said objects to form individual packages.

10. A method of packaging objects in sealed packages with the use of a pair of sheets of packaging material, one of which is deformable responsive ot heat, including the steps of: advancing such sheets to a packaging station so that one sheet overlies the other at said station; repeatedly subjecting the same portions of said deformable sheet to a deforming heat before the sheet reaches said station; progressively controlling the deformation of said portions of said sheet to form therein a series of depressions before the sheet reaches said station; placing objects on the other sheet before it reaches said station; causing said objects to be encompassed by said depressions when said sheets reach said station; sealing said deformable sheet to the other sheet around said objects to form individual packages; and repeatedly applying fluid pressure to the exterior of the deformable sheet portion of each sealed package to force such portions against said objects.

11. A method of packaging objects in sealed packages with the use of a pair of sheets of packaging material one of which is deformable under the influence of heat, including the steps of: advancing such sheets to a packaging station so that one sheet overlies the other at said station; subjecting said deformable sheet at intervals thereon before it reaches said station to a deforming heat; controlling the deformation of said sheet to provide depressions of a size for encompassing objects to be packaged; placing the objects on the other sheet before it reaches said station; causing said objects to be covered by said depressions when said sheets reach said station; sealing said deformable sheet to the other sheet around the objects to form individual packages; repeatedly creating in each package after the sealing thereof a sub-atmospheric pressure; and severing said packages from said sheets.

12. A method of packaging objects in sealed packages with the use of a pair of sheets of packaging material one of which is deformable under the influence of heat, including the steps of: advancing such sheets to a packaging station so that one sheet overlies the other at said station; subjecting said deformable sheet at intervals thereon before it reaches said station to a deforming heat; controlling the deformation of said sheet to provide depressions of a size for encompassing objects to be packaged; placing such objects on the other sheet before it reaches said station; advancing said sheets so that said depressions will extend from said objects when said sheets reach said station; repeatedly applying to the portions of said sheets for forming each package, a force effective to seal said sheets together around the object therebetween; creating a sub-atmospheric pressure within said cavities while said sheets are at said station, to force the deformable sheet against the objects; subjecting the deformable sheet to heat while it is subjected to said sub-atmospheric pressure.

13. A method of packaging objects in sealed packages, including the steps of: advancing a first sheet of packaging material in a given direction; advancing a second sheet of plastic material from a first position in which it is spaced from said first sheet, to a second position in which it overlies the first sheet; forming a series of cavities in said second sheet before the latter reaches said second position; placing at intervals on said first sheet objects to be packaged; timing said advancing of said sheets so that said objects will be encompassed by said cavities when said second sheet overlies said first sheet at said second position; sealing said sheets together around the objects therebetween to form individual packages; repeatedly creating in each package after said sealing thereof a sub-atmospheric pressure; advancing said individual packages from said second position; and severing said individual packages from said sheets.

14. A method of packaging objects in sealed packages including the steps of: advancing a first sheet of packaging material in one direction; advancing in said direction a sheet of flexible material that is deformable under the influence of heat; continuing the advance of said sheets simultaneously to dispose said sheets in a position in which said flexible sheet overlies said first sheet; subjecting said flexible sheet to deforming heat before said flexible sheet reaches said overlying position; controlling the heat-effected deformation of said flexible sheet to form a series of pockets therein before said flexible sheet reaches said overlying position; placing objects to be packaged on said first sheet; timing the advance of said sheets so that said objects will extend into said pockets when said flexible sheet reaches said overlying position; holding against said first sheet the marginal portions of said flexible sheet as well as portions of the flexible sheet lying between said pockets; sealing all of said portions of said flexible sheet to said first sheet to form individual packages; intermittently advancing said packages; creating a sub-atmospheric pressure interiorly of each of said packages between each of a series of said advances, to cause pocket forming portions of the flexible sheet to be forced against said objects; and then removing said individual packages from said sheets.

15. A method of packaging objects in sealed packages formed of portions of a pair of sheets of packaging material including the steps of: advancing said sheets toward a plurality of stations; applying an adhesive coating to one of said sheets before it reaches said stations; placing objects to be packaged between said sheets before said sheets reach said stations; continuing the advance of said sheets to said stations; forcing together at one of said stations portions of said sheets which surround said objects to form separate sealed packages; evacuating air from each of said packages through one of said sheets at each of a plurality of said stations to create a subatmospheric pressure in said packages whereby portions of one of said sheets are progressively forced against said objects and adhered to the other of said sheets, then removing said packages from said sheets.

16. A method of packaging objects in sealed packages formed of portions of a pair of sheets of packaging material, one of which is deformable, including the steps of: advancing the deformable sheet toward packaging stations; advancing the other sheet toward said stations; applying an adhesive to said other sheet before said other sheet reaches said stations; placing objects to be packaged on said other sheet before said other sheet reaches said stations; continuing the advance of said sheets to position the deformable sheet over the objects and said other sheet at one of said stations; sealing together all of the marginal portions of said sheets surrounding said objects to form separate sealed packages at said one station; applying to said deformable sheet at a plurality of said stations, a force for moving portions of the deformable sheet of each package surrounded by said sealed marginal portions thereof against the object therein and against the adhesive coated surface of said other sheet around said object, respectively; then removing said packages from said sheets.

17. A method of packaging objects in sealed packages formed of portions of a pair of elongated sheets of packaging material, one of which is flexible and the other of which is porous, including the steps of: advancing the flexible sheet toward a plurality of stations; advancing the porous sheet towards said stations; coating said porous sheet with an adhesive before said porous sheet reaches said station; placing objects to be packaged on said porous sheet before said porous sheet reaches said stations; continuing the advance of said sheets to cause the flexible sheet to overlie the porous sheet and the objects thereon at one of said stations; sealing together at said one station portions of said sheets which surround said objects to form separate packages; evacuating air from each of said packages through said porous sheet at each of said stations to create a sub-atmospheric pressure in said packages whereby portions of the flexible sheet are progressively forced against said objects and against said coated surface of said porous sheet; then removing said packages from said sheets.

18. In a machine for packaging objects in individual sealed packages: a frame; means on said frame defining a packaging station; means on said frame for advancing sheets of packaging material to said station so that one sheet overlies the other at said station; means on said frame operable to form a series of depressions in one of said sheets before said sheet reaches said station; means operatively connected with said advancing means operable on said other sheet to hold objects placed on the other sheet spaced so that said depressions will cover said objects when said sheets reach said station; and means on said frame to seal said sheets together around said objects to form individual packages.

19. In a machine for packaging objects for individual sealed packages; a frame; means on said frame defining a packaging station; means on said frame for advancing sheets of packaging material in timed relation to one another to said station so that one sheet overlies the other at said station; means on said frame operable to form depressions at longitudinally spaced points in said one sheet before the latter reaches said station; means carried by said advancing means in engagement with said other sheet operable for spacing objects placed on the other sheet so that said objects will be covered by said depressions when said sheets reach said station; means on said frame operable to seal said sheets together around said objects to form individual packages; and means operable on said frame to sever from said sheets the individual packages.

20. In a machine for packaging objects in individual sealed packages; a frame; means on the frame defining a packaging station; means for advancing to said station a sheet of packaging material which is deformable responsive to heat; means on the frame for subjecting said deformable sheet to deforming heat at intervals before said sheet reaches said station; means on the frame for controlling the deformation of said sheet to form therein depressions for covering objects to be packaged; means on the frame for advancing a second sheet to said station so that said second sheet will occupy a position beneath the deformable sheet at said station; means carried by the advancing means for engaging said second sheet and spacing objects placed on said second sheet before the latter reaches said station; said advancing means for said sheets being timed to cause said objects to be covered by said depressions when said sheets reach said station; means on said frame operable at said station to seal said sheets together around said objects to form individual packages; and means on said frame for severing from said sheets the individual packages.

21. In a machine for packaging objects in individual sealed packages; a frame; means on the frame defining a packaging station; means for advancing to said station a sheet of packaging material which is deformable when responsive to heat; a plurality of heating means on said frame spaced from one another along the path of advance of said deformable sheet for subjecting said deformable sheet to deforming heat at intervals before said sheet reaches said station; said heating means progressively increasing the deformation of said sheet during said advance to form therein depressions for covering objects to be packaged; means on the frame for advancing a second sheet to said station so as to occupy a position beneath the deformable sheet at said station; means operably connected with the advancing means for said second sheet whereby objects to be packaged when placed on said second sheet before the latter reaches said station will be spaced so that said depressions will cover said objects when said sheets reach said station; means operable at said station for forcing portions of said deformable sheet into contact with said objects; means on said frame for sealing together around said objects the marginal portions of said sheets as well as portions of said sheets between said objects to form individual packages; and means on said frame for severing from said sheets the individual packages thus formed.

22. In a machine for packaging objects in individual sealed packages: a frame; an endless conveyor on the frame; means for operating said conveyor to advance along one run thereof a first sheet of packaging material on which objects to be packaged may be placed and advanced in spaced relation to one another; a pair of endless conveyors mounted on said frame above said first named conveyor; means for operating said pair of conveyors to advance a sheet of flexible packaging material to a position overlying the objects and said first sheet; means on the frame for sealing said sheets together around said objects to form sealed packages joined to one another; means on said frame extending through said first sheet for evacuating air from said packages to cause portions of said flexible sheet to contact said objects; and means for severing said sheets between said sealed packages.

23. In a machine for packaging objects in individual sealed packages; a frame; an endless conveyor on the frame; means for operating said conveyor to advance along one run of the conveyor a first sheet of packaging material on which objects to be packaged may be placed; means on said conveyor extending through said sheet operable for maintaining the objects in spaced relation to one another; a pair of endless conveyors mounted on said frame above said first named conveyor; means for operating said pair of conveyors to advance a sheet of flexible packaging material into a position overlying said objects and said first sheet; means on the frame for sealing said sheets to one another around said objects to form individual packages; means on said frame for evacuating air from said packages to cause portions of said flexible sheet to engage said objects and said first sheet and means for removing said individual packages from said sheets.

24. In a machine for packaging objects in individual sealed packages: a frame; an endless conveyor on the frame; means for operating said conveyor to intermittently advance along one run of the conveyor a first sheet of packaging material on which objects to be packaged may be placed in spaced relation to one another; a pair of endless conveyors mounted on said frame above said first named conveyor; means operating said pair of conveyors for advancing a sheet of flexible packaging material to a position overlying the objects and said first sheet; an element on said frame operable to form a depression in said flexible sheet; other elements on said frame spaced from one another along the path of advance of said flexible sheet for progressively increasing the depth of said depression during said advance before the depression reaches said position; means timing the operation of said conveyors so that said depressions will encompass said objects at said position; means on said frame for sealing said sheets together around said objects to form individual packages; and means for severing said sheets between said packages.

25. In a machine for packaging objects in individual sealed packages: a frame; an endless conveyor on the frame; means for operating said conveyor to advance along one run of the conveyor a first sheet of packaging material on which objects to be packaged may be placed in spaced relation to one another; a pair of endless conveyors mounted on said frame above said first named conveyor; means operating said pair of conveyors for advancing a sheet of flexible packaging material to a position overlying the objects and said first sheet; means on said frame for applying an adhesive to said first sheet before the latter reaches said position; a member mounted on said frame for movement into and out of a position for repeatedly pressing the portions of said flexible sheet that overlie object against the adhesive coated surface of said first sheet to seal said sheets around said objects and form individual packages; and means on said frame for removing said individual packages from said sheets.

26. In a machine for packaging objects in individual sealed packages: a frame; an endless conveyor on the frame; means for operating said conveyor to advance along one run of the conveyor a first sheet of packaging material on which objects to be packaged may be placed in spaced relation to one another; a pair of endless conveyors mounted on said frame above said first named conveyor; means operating said pair of conveyors for advancing a sheet of flexible packaging material to a position overlying the objects and said first sheet; means on said frame for applying an adhesive to said first sheet before the latter reaches said position; means on said frame for pressing portions of said flexible sheet against the adhesive coated surface of said first sheet to seal said sheets around said objects and form individual packages; and separate means on said frame spaced one from the other in the direction of said advance, each operable to create a vacuum within each package such that said flexible sheet progressively will be forced into conformity with the object and become adhered to the adhesive coated surface of said first sheet.

27. In a machine for packaging objects in individual sealed packages; a frame; an endless conveyor on the frame; means for operating said conveyor to advance along one run of the conveyor a first sheet of packaging material on which objects to be packaged may be placed; a pair of endless conveyors mounted on said frame above said first named conveyor; said pair of conveyors having opposed runs; means for operating said pair of conveyors for advancing a sheet of flexible material between said runs and thence into a position overlying said first sheet; one of the conveyors of said pair having a plurality of cup members thereon; means on said frame cooperable with said cup members for forming in said flexible sheet a plurality of depressions which extend into said cup members; said depressions and cup members overlying said objects and said first sheet when said flexible sheet reaches said overlying position; means mounted on said frame for movement into and from a position for engaging and pressing a plurality of said cup members against said flexible sheet to seal said sheets together around said objects to form individual sealed packages; and means on said frame for separating said individual sealed packages from said sheets.

28. In a machine for packaging objects in individual sealed packages; a frame; an endless conveyor on the frame; means for operating said conveyor to advance along one run of the conveyor a first sheet of packaging material on which objects to be packaged may be placed; a pair of endless conveyors mounted on said frame above said first named conveyor; said pair of conveyors having opposed runs; means for operating said pair of conveyors for advancing a sheet of flexible material between said runs and thence into a position overlying said first sheet; one of the conveyors of said pair having a plurality of cup members thereon; means on said frame cooperable with said cup members for forming in said flexible sheet a plurality of depressions which extend into said cup members; said depressions and cup members overlying said objects and said first sheet when said flexible sheet reaches said overlying position; means mounted on said frame for movement into and from a position pressing a plurality of said cup members against said flexible sheet for sealing said sheets together simultaneously around a plurality of said objects to form a row of sealed packages joined by portions of said sheets; and means on said frame operable to sever the portions of said sheets joining the sealed packages.

29. In a machine for packaging objects in individual sealed packages: a frame; an endless conveyor on the frame; means for operating said conveyor to advance along one run of the conveyor a first sheet of packaging material on which objects to be packaged may be placed; a pair of endless conveyors mounted on said frame above said first named conveyor; said pair of conveyors having opposed runs; means for operating said pair of conveyors for advancing a sheet of flexible material between said runs and thence into a position overlying said first sheet; one of the conveyors of said pair having a plurality of cup members thereon; means on said frame cooperable with said cup members for forming in said flexible sheet a plurality of depressions which extend into said cup members; said depressions and cup members overlying said objects and said first sheet when said flexible sheet reaches said overlying position; means mounted on said frame for movement into and from a position pressing a plurality of said cup members against said flexible sheet for sealing said sheets together simultaneously around a plurality of said objects to form individual sealed packages and means on said frame operable for creating a vacuum in said packages whereby atmospheric pressure will force the flexible sheet portions of said packages into contact with said objects and said first sheet.

30. In a machine for packaging objects in individual sealed packages: a frame; an endless conveyor on the frame; means for operating said conveyor to advance along one run of the conveyor a first sheet of packaging material on which objects to be packaged may be placed; said conveyor including a plurality of supporting members for said first sheet; tubular pins mounted on said supporting members; means operable on said frame for forming holes in said first sheet; said pins being extensible through said holes; said supporting members having passage means therein in communication with the bores of said tubular pins; means on said frame for advancing a sheet of flexible material into a position overlying said objects, said pins and said first sheet; means on said frame operable to seal said sheets together around said objects and pins to form packages; and means on said frame for creating through said passage means and said pins a vacuum in said packages.

31. In a machine for packaging objects in individual sealed packages: a frame; means on said frame for advancing with a step-by-step motion a pair of sheets of packaging material with objects therebetween, into a position in which said sheets overlie one another; means on said frame operable while said advancing means is at rest for forming in one of said sheets before it reaches said position, a plurality of depressions which will encompass said objects when said sheets reach said position; said depression forming means including separate heating means arranged in a row extending in the direction of advance of said one sheet for applying heat to said one sheet; and means on said frame operable at said position while said advancing means is at rest, for sealing said sheets together around said objects to form sealed packages.

32. In a machine for packaging objects in individual sealed packages: a frame; means on said frame for advancing with a step-by-step motion a pair of sheets of packaging material with objects therebetween, into a position in which said sheets overlie one another; means on said frame operable while said advancing means is at rest for forming in one of said sheets before it reaches said position, a plurality of depressions which will encompass said objects when said sheets reach said position; said depression forming means including separate heating means arranged in a row extending in the direction of advance of said one sheet for applying heat to said one sheet; means on said frame operable at said position while said advancing means is at rest, for sealing said sheets together around said objects to form sealed packages; and separate means on said frame arranged in a row extending in the direction of advance of said sheets; each such means being operable to form a vacuum in each of a plurality of said packages while said advancing means is at rest.

33. In a machine for packing objects in individual sealed packages: a frame; means on said frame for advancing with a step-by-step motion a pair of sheets of packaging material with objects therebetween, into a position in which said sheets overlie one another; said advancing means including a main conveyor on which one of said sheets and the objects thereon are advanced and a pair of conveyors above said main conveyor for advancing the other sheet therebetween and onto said one sheet at said position; separate elements fixed on said frame in a row extending in the direction of advance of said other sheet, with each such element operable on the same portion of said other sheet to progressively form pockets in said other sheet; the advance of said conveyors being such that the pockets formed in said other sheet will encompass said objects at said position; and means on said frame for sealing said sheets together around said objects to form sealed packages.

34. In a machine for packaging objects in sealed packages: a frame; an endless conveyor on said frame; said conveyor including a plurality of plate like members movable therewith; each of said members having passage means therein; tubular pins; means mounting said pins on said member with the bores of said pins in communication with said passage means; means on said frame for punching holes in a first sheet of packaging material, said pins being extensible through said holes; means for operating said conveyor to advance over one run of said conveyor said first sheet, with the object to be packaged supported on said sheet adjacent said pins; means on said frame for advancing a second sheet of packaging material to a position in which it overlies said objects, pins and first sheet; means on said frame for urging said second sheet against said first sheet to seal said sheets together around said objects and pins to form sealed packages; and means on said frame for creating a vacuum in said packages through said passage means and said pins.

35. In a machine for packaging objects in sealed packages: a frame; an endless conveyor on said frame; said conveyor including a plurality of plate like members movable therewith; each of said members having passage means therein; tubular pins; means mounting said pins on said member with the bores of said pins in communication with said passage means; means on said frame for punching holes in a first sheet of packaging material, said pins being extensible through said holes; means for operating said conveyor to advance over one run of said conveyor said sheet, with the object to be packaged supported on said sheet adjacent said pins; means on said frame for advancing a second sheet of packaging material to a position in which it overlies said objects, pins and first sheet; means on said frame for forcing said second sheet against said first sheet to seal said sheets together around said objects and pins to form sealed packages; means on said frame for creating a vacuum in said packages through said passage means and said pins; said last named means including nozzles adapted to be communicated with a source of vacuum; and means on said frame operable to move said nozzles into and from communication with said passage means in said plate members.

36. In a machine for packaging objects in sealed packages; a frame; a conveyor on said frame; said conveyor including a plurality of plate like members movable therewith; each of said members having passage means therein; tubular pins; means mounting said pins on said members with the bores of said pins in communication with said passage means; means on said frame for punching holes in a first sheet of packaging material, said pins being extensible through said holes; means for operating said conveyor to advance over one run of said conveyor said sheet with the object to be packaged supported on said sheet adjacent said pins; means on said frame for advancing a second sheet of packaging material to a position in which it overlies said objects, said pins and said first sheet; means on said frame for forcing said second sheet against said first sheet to seal said sheets together around said objects and pins to form sealed packages; means on said frame for creating a vacuum in said packages through said passage means and said pins; said last named means including nozzles adapted to be communicated with a source of vacuum; means on said frame operable to move said nozzles into and from communication with said passage means in said plate members; means on said frame for severing said sheets between said packages; and means on said frame for removing said packages from said conveyor.

37. In a machine for packaging objects in sealed packages: a frame; a conveyor on said frame; said conveyor including a plurality of plate-like members movable therewith; each of said members having passage means therein; tubular pins; means mounting said pins on said member with the bores of said pins in communication with said passage means; means on said frame for punching holes in a first sheet of packaging material, said pins being extensible through said holes; means for operating said conveyor to advance over one run of said conveyor said sheet with the object to be packaged supported on said sheet adjacent said pins; means on said frame for advancing a second sheet of packaging material to a position in which it overlies said objects, said pins and said first sheet; means on said frame for forcing said second sheet against said first sheet to seal said sheets together around said objects and pins to form sealed packages; means on said frame for creating a vacuum in said packages through said passage means and said pins; said last named means including nozzles adapted to be communicated with a source of vacuum; means on said frame operable to move said nozzles into and from communication with said passage means in said plate members; means on said frame for severing said sheets between said packages; and means on said frame for removing said packages from said conveyor; said removing means including nozzles adapted to be converted with a source of compressed air; and means on said frame for moving said nozzles into and from communication with said passage means.

38. In a machine for packaging objects wherein packaging means are operable to seal to one another a pair of sheets of packaging material with the objects enclosed between the sheets to form individual sealed packages; and wherein advancing means are operable to move said sheets with the objects therebetween into position where said packaging means are operative; that improvement wherein a plurality of heat applying elements are arranged in a row in the direction of advance of one of said sheets and in opposition relation to such one sheet; wherein said one sheet is composed of a material which will sag responsive to heat applied by said elements; wherein said advancing means includes provision for advancing said one sheet in a step-by-step movement past said heat applying elements; and wherein said heat applying elements are operable during each rest period of said one sheet to subject portions of said one sheet to a heat which will cause said heated portions to gravitationally sag progressively per heat application and form pockets for encompassing said objects.

39. In a machine for packaging objects wherein packaging means are operable to seal to one another a pair of sheets of packaging material with the objects enclosed between the sheets to form individul sealed packages; and wherein advancing means are operable to effect intermittent movement of said sheets with the objects therebetween into and from a position where said packaging means is operable to form said individual packages; that improvement wherein said advancing means includes a conveyor on which said individual packages are formed and by which said packages are intermittently moved; said conveyor having means thereon providing passages which open into the interior of the sealed individual packages; means for creating a vacuum in said sealed packages through said passages; said last named means including a nozzle movable into and from position for communicating said passages with a source of vacuum; and means operable in timed relation to said endless conveyor for so moving said nozzle.

40. In a machine for packaging objects wherein packaging means are operable to seal to one another a pair of sheets of packaging material with the objects enclosed between the sheets to form individual sealed packages; and wherein advancing means are operable to effect intermittent movement of said sheets with the objects therebetween into and from a position where said packaging means is operable to form said individual packages; that improvement wherein said advancing means includes a conveyor on which said individual packages are formed and by which said packages are intermittently moved; said conveyor having means thereon providing passages which open into the interior of the sealed individual packages; means cooperable with said passages for creating a vacuum in each sealed package at each of a plurality of positions to which each sealed package is advanced by said conveyor; said last named means including a plurality of nozzles movable into and from a position for communicating passages with a source of vacuum; and means operable to so move said nozzles.

41. In a machine for packaging objects wherein packaging means are operable at a packaging station to seal to one another around objects to be packaged, a pair of sheets of packaging material to form individual sealed packages; and wherein advancing means are operable to move said sheets with the objects therebetween to said packaging station; that improvement which includes means for applying heat to one of said sheets before said sheet reaches said station; said one sheet being formed of a material which will sag and form pockets therein; and means for controlling the application of heat from said applying means to said one sheet to cause said pockets to be formed so as to cover the objects at said packaging station; said last named means including members movable between said heat applying means and said one sheet; said members having openings through which said heat is applied to said one sheet.

42. In a machine for packaging objects wherein packaging means are operable at a packaging station to seal to one another around objects to be packaged, a pair of sheets of packaging material to form individual sealed packages; and wherein advancing means are operable to move said sheets with the objects therebetween to said packaging station; that improvement which includes means for applying heat to one of said sheets before said sheet reaches said station; said one sheet being formed of a material which will sag and form pockets therein; and means for controlling the application of heat from said applying means to said one sheet to cause said pockets to be formed so as to cover the objects at said packaging station; said last named means including members movable between said heat applying means and said one sheet; said members having openings through which said heat is applied to said one sheet; and and adjusting means operable for changing the position of said members relative to said heat applying means and said one sheet for selectively applying heat to different portions of said one sheet.

43. In a machine for packaging objects wherein packaging means are operable at a packaging station to seal to one another around objects to be packaged, a pair of sheets of packaging material to form individual sealed packages; and wherein advancing means are operable to move said sheets with the objects therebetween to said packaging station; that improvement which includes means for applying heat to one of said sheets before said sheet reaches said station; said one sheet being formed of a material which will sag and form pockets therein; means for controlling the application of heat from said applying means to said one sheet to cause said pockets to be formed so as to cover the objects at said packaging station; said last named means including a conveyor movable between said heat applying means and said one sheet; said conveyor having openings therein through which heat from said heat applying means is applied to said one sheet; and means for adjusting said conveyor to change the position of said openings with respect to said heat applying means and said one sheet for selectively applying heat to different portions of said one sheet.

44. In a machine for packaging objects wherein packaging means are operable at a packaging station to seal to one another around objects to be packaged, a pair of sheets of packaging material to form individual sealed packages; and wherein advancing means are operable to move said sheets with the objects therebetween to said packaging station; that improvement which includes means at said station operable for applying heat to one of said sheets during operation of said packaging means; said last named means including a row of heat applying elements extending in the direction of advance of said sheets; and means for controlling the application of heat from said elements to said one sheet.

45. In a machine for packaging objects wherein packaging means are operable at a packaging station to seal to one another around objects to be packaged, a pair of sheets of packaging material to form individual sealed packages; and wherein advancing means are operable to move said sheets with the objects therebetween to said packaging station; that improvement which includes means at said station operable for applying heat to one of said sheets; said advancing means including a conveyor having a plurality of cup members in which portions of said one sheet are disposed; said cup members having openings therein through which heat from said heat applying means is applied to said portions of said one sheet at said station.

46. In a machine for packaging objects wherein packaging means are operable at a packaging station to seal to one another around objects to be packaged, a pair of sheets of packaging material to form individual sealed packages; and wherein advancing means are operable to move said sheets with the objects therebetween to said packaging station; that improvement which includes means for applying heat to one of said sheets before said sheet reaches said station; said one sheet being formed of a material which will sag and form pockets therein; means for controlling the application of heat from said applying means to said one sheet to cause said pockets to be formed so as to cover the objects at said packaging station; means at said station for applying heat to said pockets; said advancing means including a conveyor having a plurality of cup members in which said pockets are disposed; said cup members having in the bottoms thereof openings through which heat is applied to said pockets at said station.

47. In a machine for packaging objects wherein packaging means are operable at a packaging station to seal to one another around objects to be packaged, a pair of sheets of packaging material to form individual sealed packages; and wherein advancing means are operable to move said sheets with the objects therebetween to said packaging station; that improvement which includes a conveyor forming a part of said advancing means operable to advance to said station, one of said sheets with said objects thereon; and heating means operable to apply heat to said one sheet and the objects thereon before said one sheet and said objects thereon reach said station.

48. In a machine for packaging objects wherein packaging means are operable at a packaging station to seal to one another around objects to be packaged, a pair of sheets of packaging material to form individual sealed packages; and wherein advancing means are operable to move said sheets with the objects therebetween to said packaging station; that improvement which includes means for applying heat to one of said sheets before said sheet reaches said station; said one sheet being formed of a material which will sag and form pockets therein; means for controlling the application of heat from said applying means to said one sheet to cause said pockets to be formed so as to cover the objects at said packaging station; said advancing means including a conveyor on which the other of said sheets with said objects thereon is moved to said station; and heating means for applying heat to said other sheet and said objects thereon in advance of said station.

49. In a machine for packaging objects wherein packaging means are operable at a packaging station to seal to one another around objects to be packaged, a pair of sheets of packaging material to form individual sealed packages, and wherein advancing means are operable to move said sheets with the objects therebetween to said packaging station; that improvement which includes means operable to apply an adhesive to one of said sheets so that the adhesive will be between said sheets when said sheets reach said station; means operable to form a plurality of openings through said adhesive on said one sheet before said sheets reach said station; and means operable at said station to evacuate air from said sealed packages through said one sheet.

50. In a machine for packaging objects wherein packaging means are operable at a packaging station to seal to one another around objects to be packaged, a pair of sheets of packaging material to form individual sealed packages, and wherein advancing means are operable to move said sheets with the objects therebetween to said packaging station; means operable to apply an adhesive to one of said sheets so that the adhesive will be between said sheets before said sheets reach said station; means operable to heat said adhesive on said one sheet before said sheets reach said station; means operable to make a plurality of said openings through said adhesive and so that said openings will extend into said one sheet before said sheets reach said station; and means operable at said station to evacuate the air from each sealed package through said one sheet.

References Cited in the file of this patent

UNITED STATES PATENTS

| | | |
|---|---|---|
| 1,048,227 | Strubel | Dec. 24, 1912 |
| 1,481,866 | Heist | Jan. 29, 1924 |
| 2,116,995 | Bickford | May 10, 1938 |
| 2,219,578 | Pittenger | Oct. 29, 1940 |
| 2,229,613 | Strauch | Jan. 21, 1941 |
| 2,472,440 | Salfisberg | June 7, 1949 |
| 2,497,212 | Donofrio | Feb. 14, 1950 |
| 2,529,777 | McInnis | Nov. 14, 1950 |
| 2,549,123 | Osterhof | Apr. 17, 1951 |
| 2,597,041 | Stokes | May 20, 1952 |
| 2,750,719 | Wandelt | June 19, 1956 |
| 2,855,735 | Groth | Oct. 14, 1958 |
| 2,861,404 | Stratton | Nov. 25, 1958 |
| 2,861,405 | Hanford | Nov. 25, 1958 |